United States Patent
Shoji et al.

(10) Patent No.: US 10,514,629 B2
(45) Date of Patent: Dec. 24, 2019

(54) SEALING MATERIAL COMPRISING CUT PILE WOVEN FABRIC

(71) Applicants: SANWA TECHNO CO., LTD., Kobe-shi, Hyogo (JP); Susumu Shoji, Kobe-shi, Hyogo (JP)

(72) Inventors: Susumu Shoji, Kobe (JP); Kazuro Fukui, Kobe (JP)

(73) Assignees: SANWA TECHNO CO., LTD., Kobe-shi, Hyogo (JP); Susumu Shoji, Kobe-shi, Hyogo (JP)

( * ) Notice: Subject to any disclaimer, the term of this patent is extended or adjusted under 35 U.S.C. 154(b) by 0 days.

(21) Appl. No.: 16/310,919

(22) PCT Filed: Jun. 18, 2016

(86) PCT No.: PCT/JP2016/068193
§ 371 (c)(1),
(2) Date: Jan. 17, 2019

(87) PCT Pub. No.: WO2017/216975
PCT Pub. Date: Dec. 21, 2017

(65) Prior Publication Data
US 2019/0179235 A1    Jun. 13, 2019

(51) Int. Cl.
*G03G 15/08* (2006.01)
*B32B 5/02* (2006.01)
(Continued)

(52) U.S. Cl.
CPC ......... *G03G 15/0817* (2013.01); *B32B 5/024* (2013.01); *B32B 5/18* (2013.01);
(Continued)

(58) Field of Classification Search
CPC .................................................. G03G 15/0817
(Continued)

(56) References Cited

U.S. PATENT DOCUMENTS

| 9,268,262 B2 * | 2/2016 | Shoji et al. ........ G03G 15/0817 |
| 9,500,989 B2 * | 11/2016 | Shoji et al. ........ G03G 15/0817 |

(Continued)

FOREIGN PATENT DOCUMENTS

| JP | 2003-140465 A | 5/2003 |
| JP | 2003-223047 A | 8/2003 |

(Continued)

OTHER PUBLICATIONS

International Search Report dated Aug. 2, 2016, issued in counterpart International Application No. PCT/JP2016/068193, with English Translation. (4 pages).

*Primary Examiner* — William J Royer
(74) *Attorney, Agent, or Firm* — Westerman, Hattori, Daniels & Adrian, LLP

(57) ABSTRACT

A sealing material reduces heat due to friction produced by contact with a rotating body. The sealing material 1 has cut pile woven fabric 3c having stripes. The sealing material 1 prevents leakage of powder 8 from rotating body or straight body 7b. The woven pile fabric 3b constituting sealing material 1 is woven pattern 3a having stripes which is woven from pile yarn 6 comprising a plurality of filaments 9, woven pattern 3a being cut pile woven fabric 3c having cut pile 4 at which pile 4 is of prescribed length, cut pile woven fabric 3c having steps 7e produced by differences in thickness of cut pile 4 including woven pattern 3e having stripes. The length of cut pile 4 of prescribed length has cut pile length 4d which is greater than the spacing of a pitch between pile supporting yarns 5 that support pile 4.

10 Claims, 15 Drawing Sheets

(51) Int. Cl.
  *B32B 5/18*   (2006.01)
  *B32B 5/24*   (2006.01)
  *B32B 7/12*   (2006.01)
  *D03D 27/16*  (2006.01)
  *F16J 15/18*  (2006.01)

(52) U.S. Cl.
  CPC ............... *B32B 5/245* (2013.01); *B32B 7/12* (2013.01); *D03D 27/16* (2013.01); *F16J 15/18* (2013.01); *B32B 2250/02* (2013.01); *B32B 2255/02* (2013.01); *B32B 2255/24* (2013.01); *B32B 2581/00* (2013.01); *G03G 2215/0636* (2013.01); *G03G 2215/0855* (2013.01)

(58) Field of Classification Search
  USPC .................................................. 399/102, 103
  See application file for complete search history.

(56) References Cited

U.S. PATENT DOCUMENTS

| | | | |
|---|---|---|---|
| 9,588,459 B2* | 3/2017 | Uno et al. | G03G 15/0817 |
| 2013/0147122 A1 | 6/2013 | Shoji et al. | |

FOREIGN PATENT DOCUMENTS

| | | |
|---|---|---|
| JP | 2005-179871 A | 7/2005 |
| JP | 2005-283729 A | 10/2005 |
| JP | 2005-300910 A | 10/2005 |
| JP | 2006-249383 A | 9/2006 |
| JP | 2008-26729 A | 2/2008 |
| JP | 2010-128449 A | 6/2010 |
| JP | 2011-203390 A | 10/2011 |
| JP | 2014-137400 A | 7/2014 |
| JP | 5636044 B2 | 12/2014 |
| WO | 2013/164871 A1 | 11/2013 |

* cited by examiner

[FIG. 1]
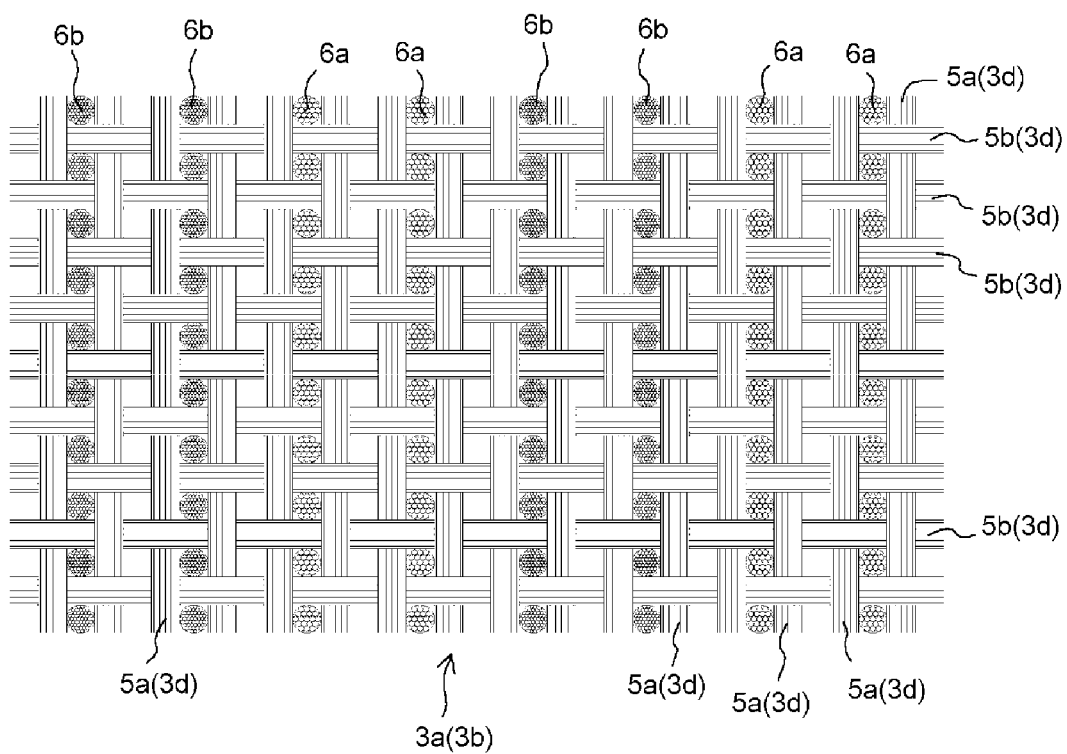

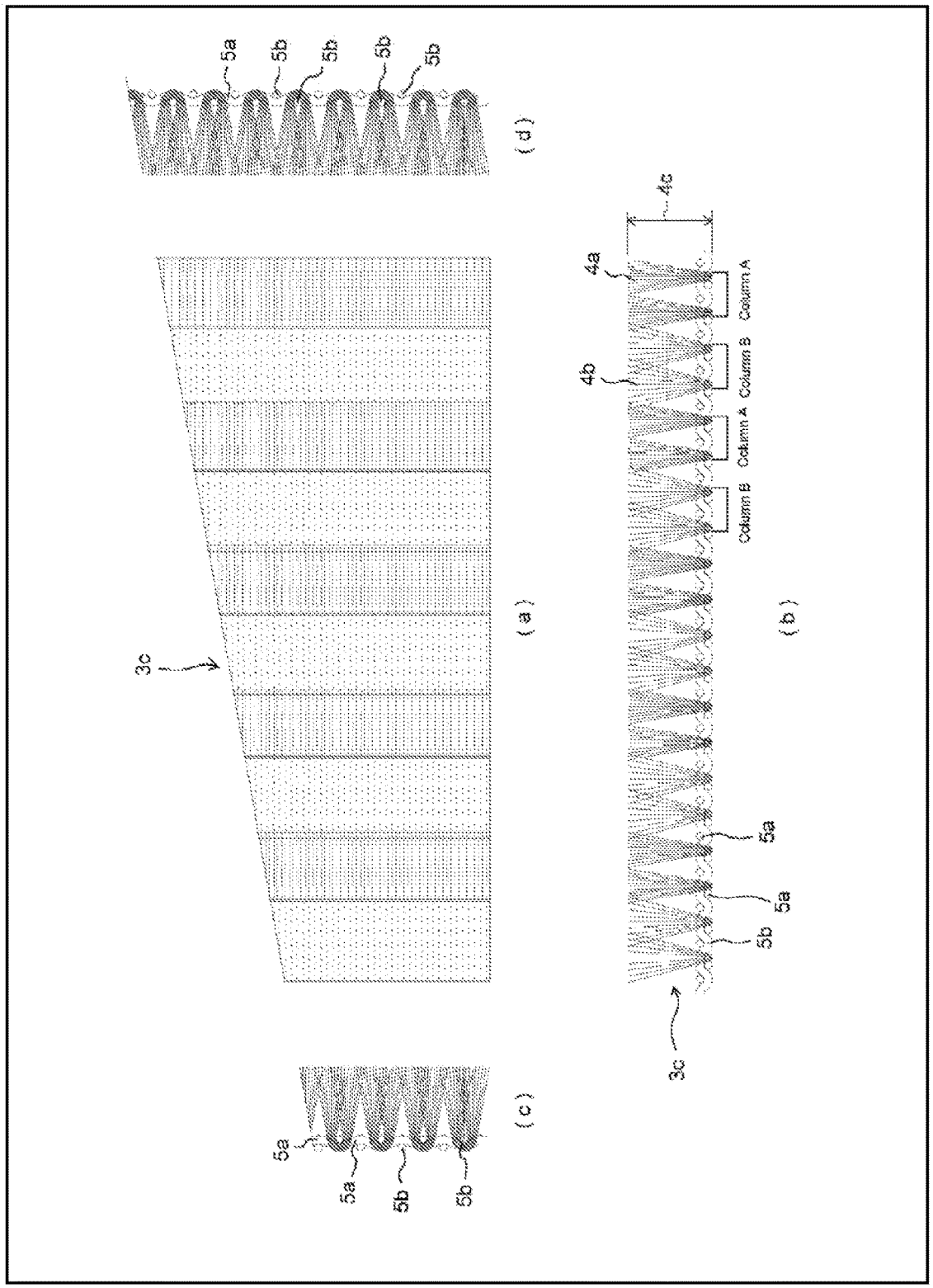

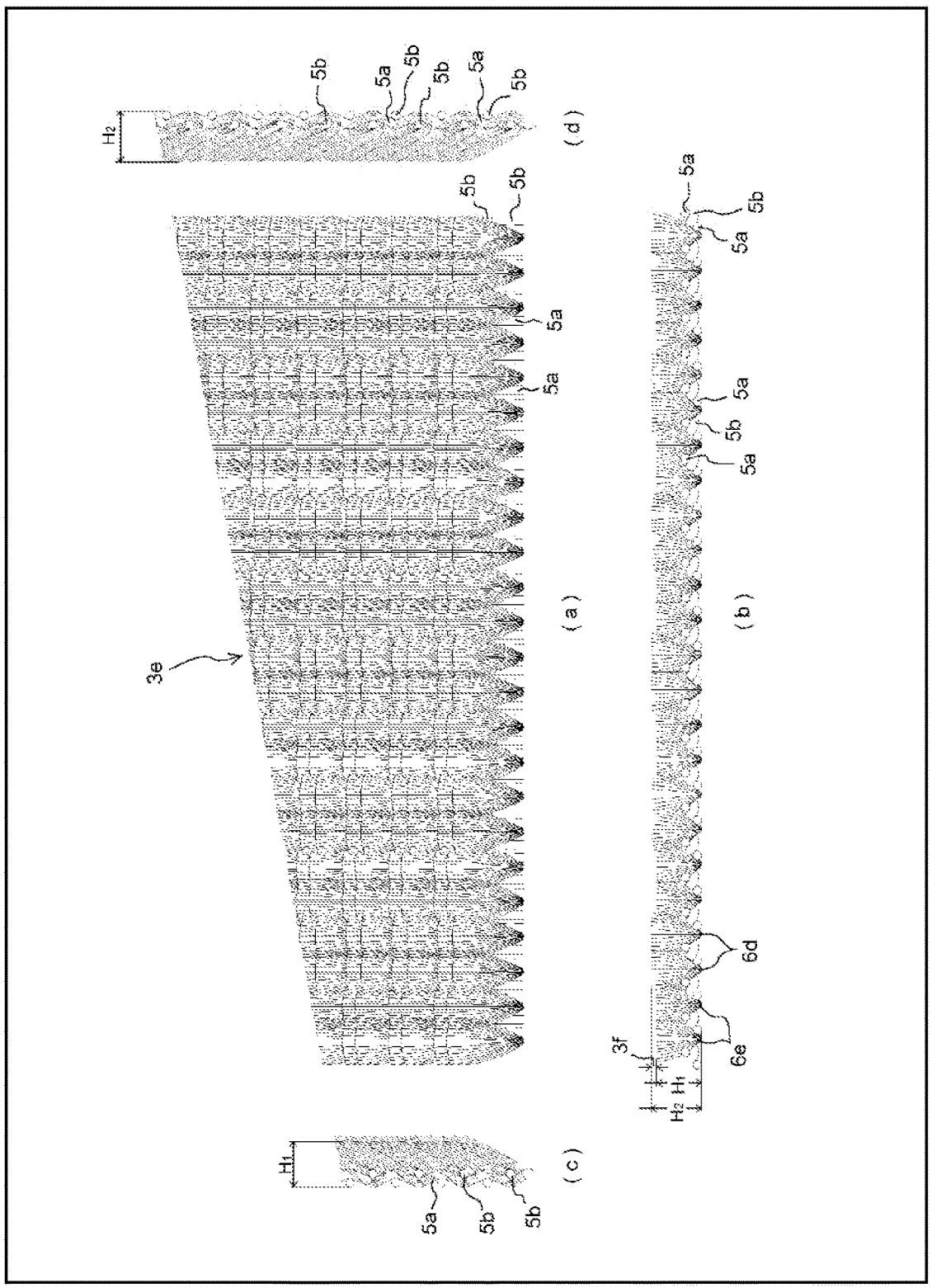

[FIG. 4]
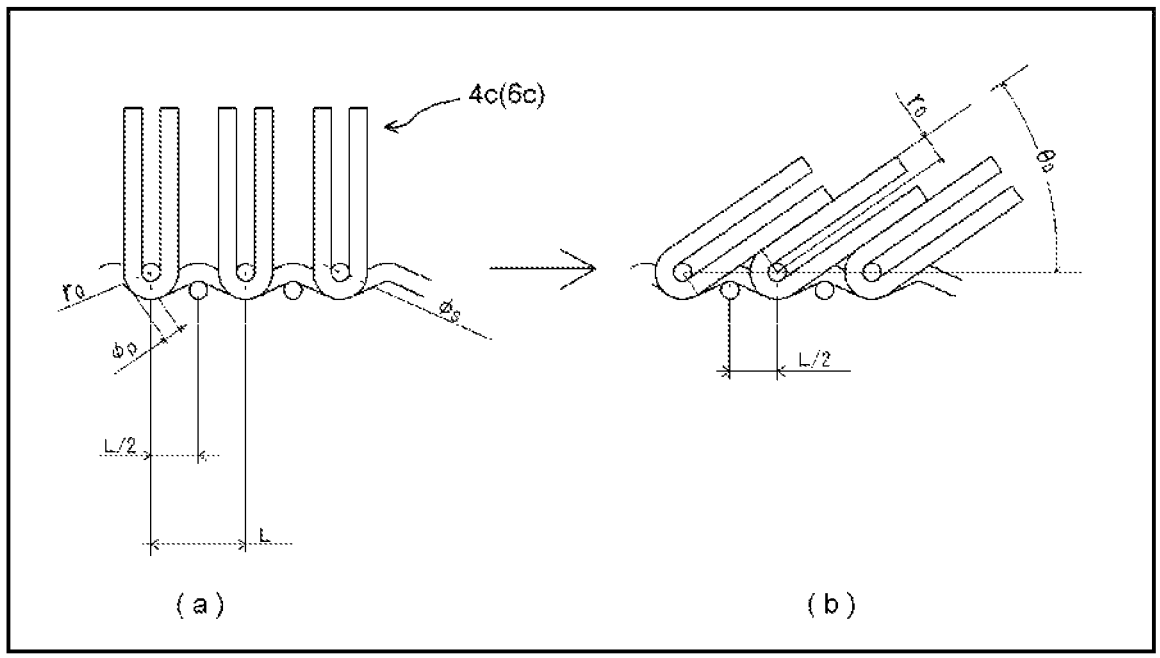
[FIG. 5]
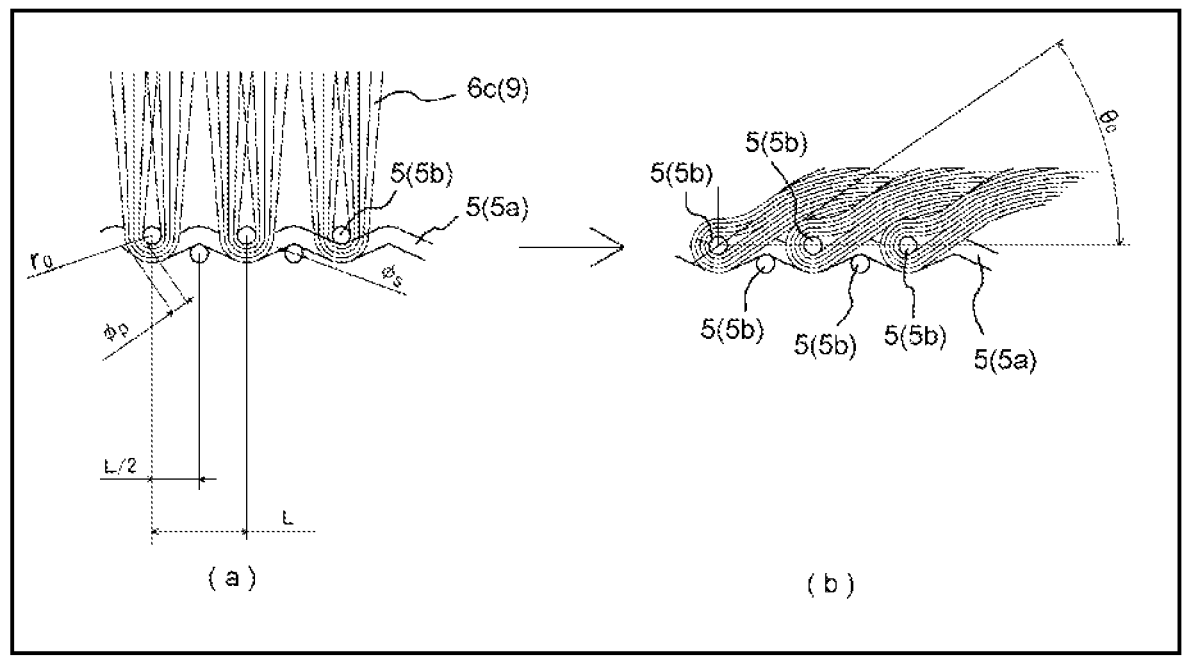

[FIG. 6]
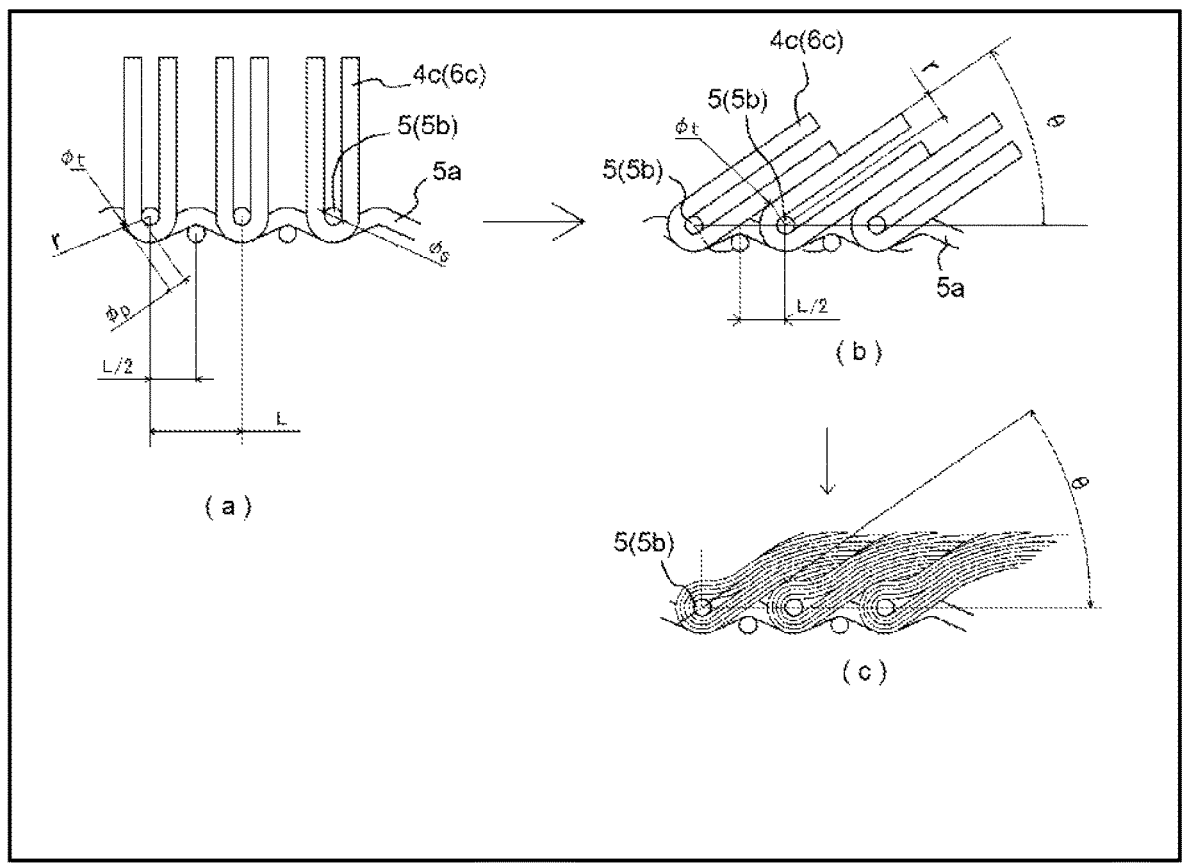

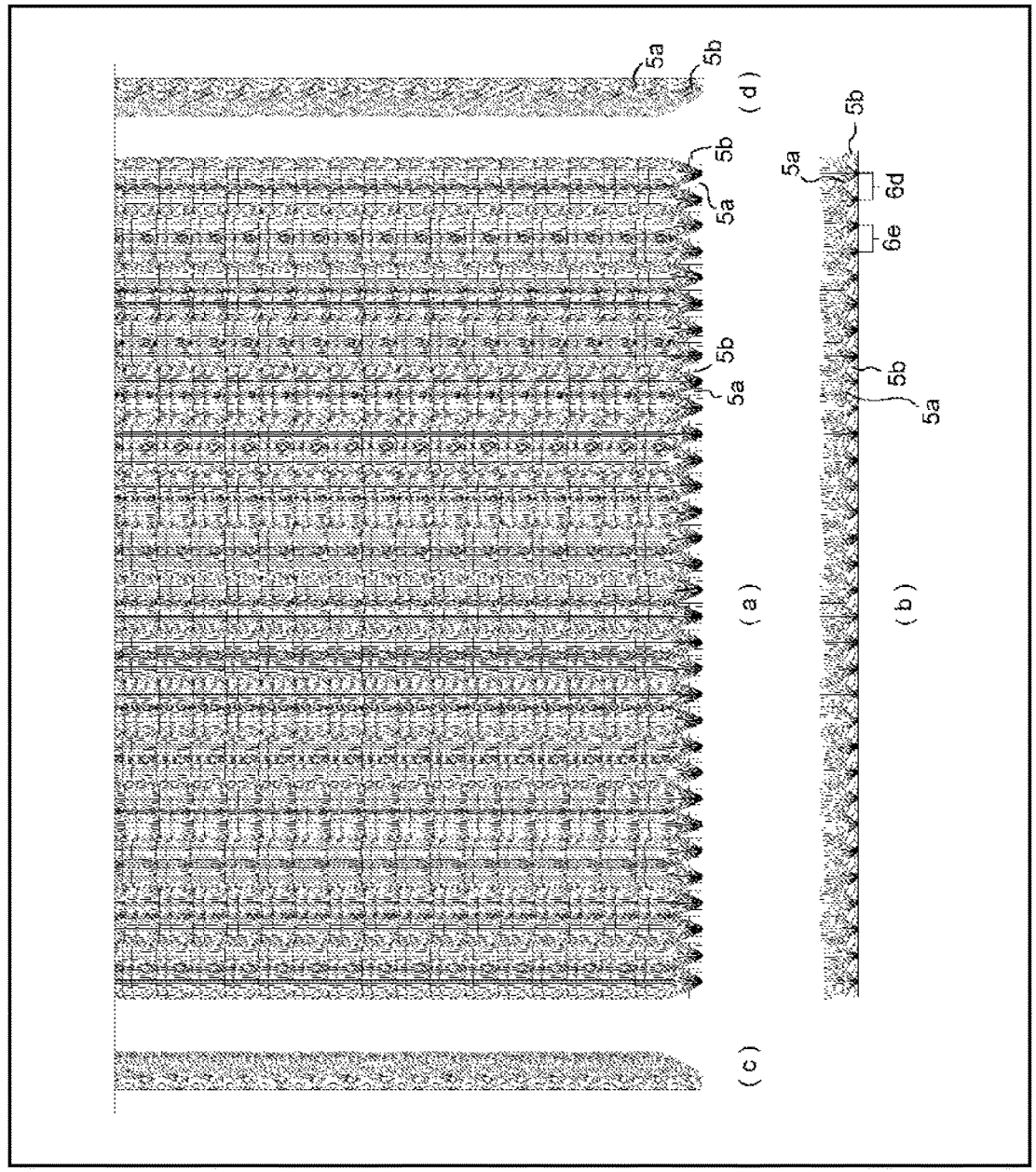

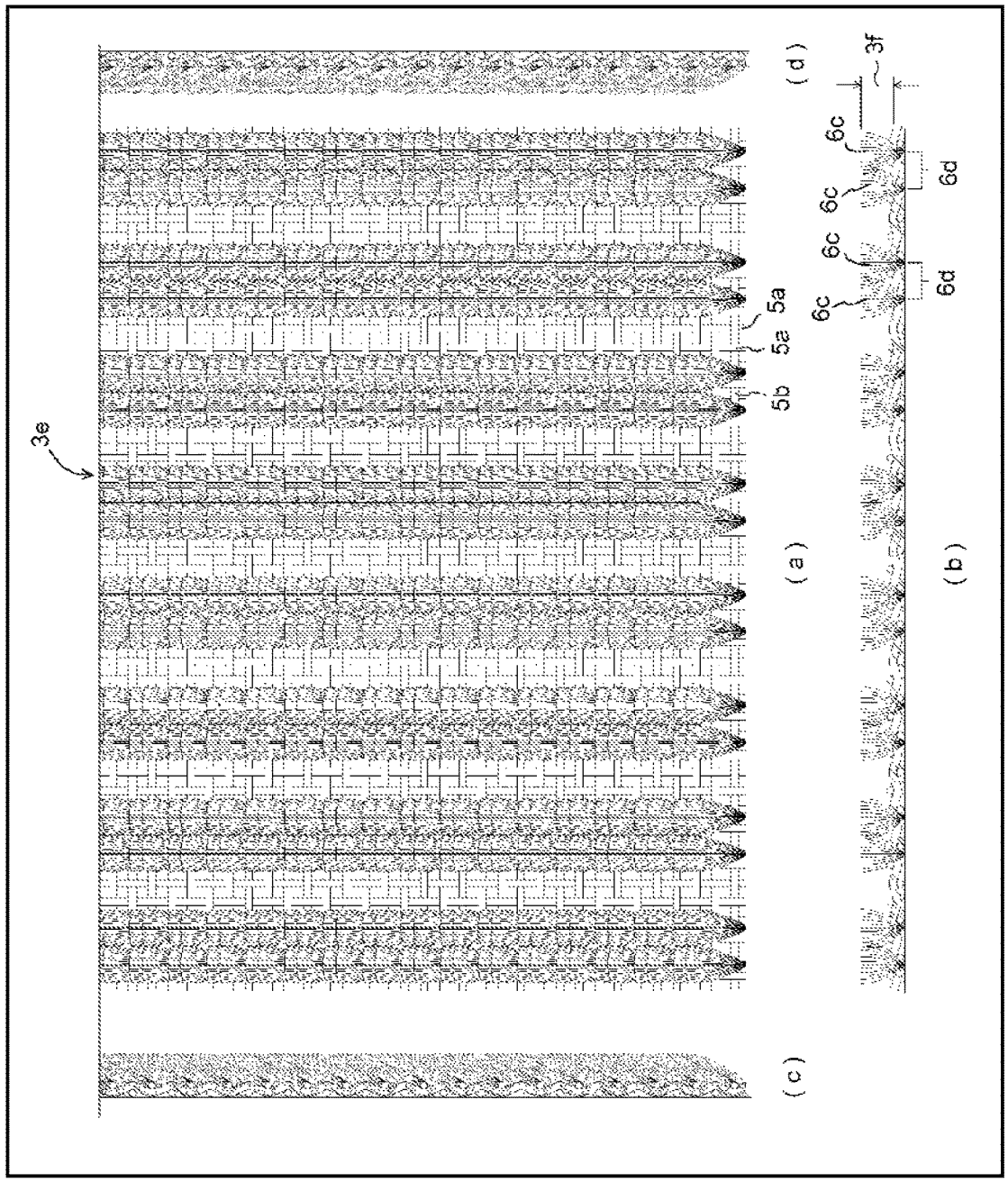

[FIG. 9]
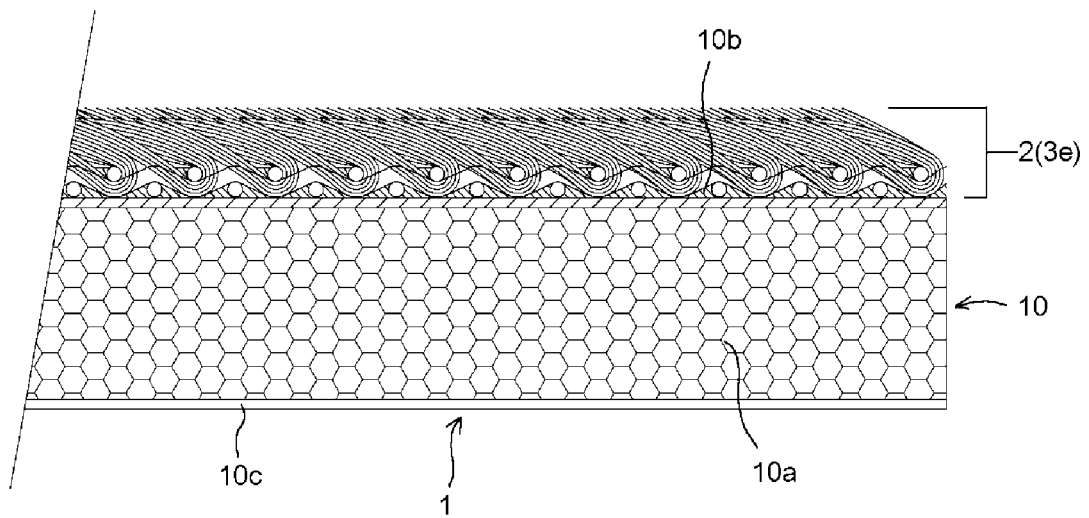

[FIG. 10]
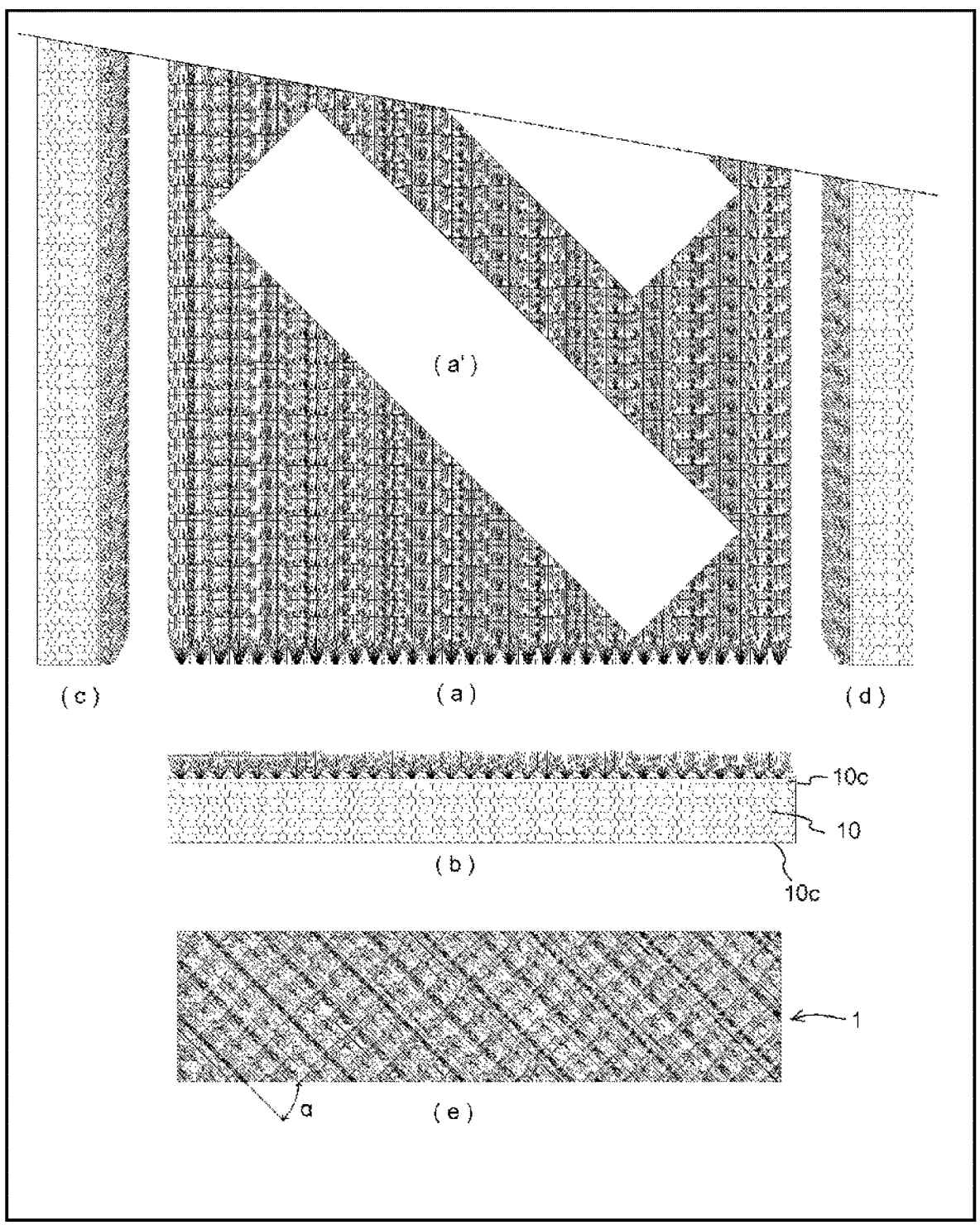

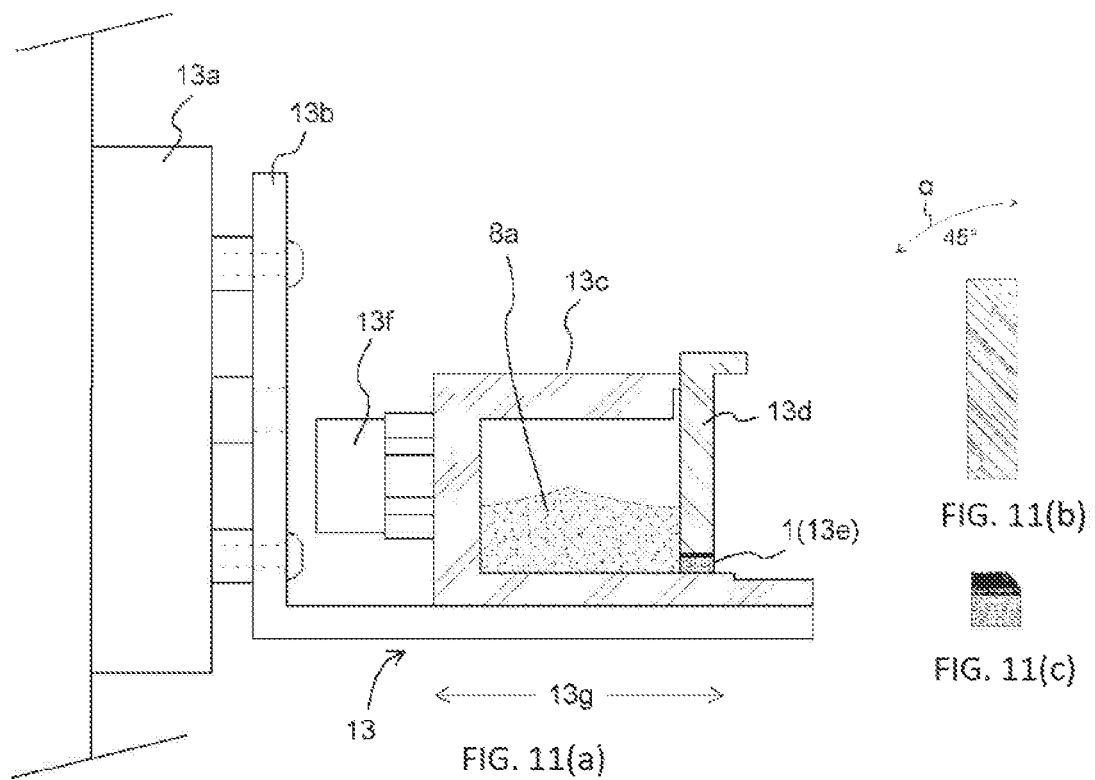

[FIG. 12]
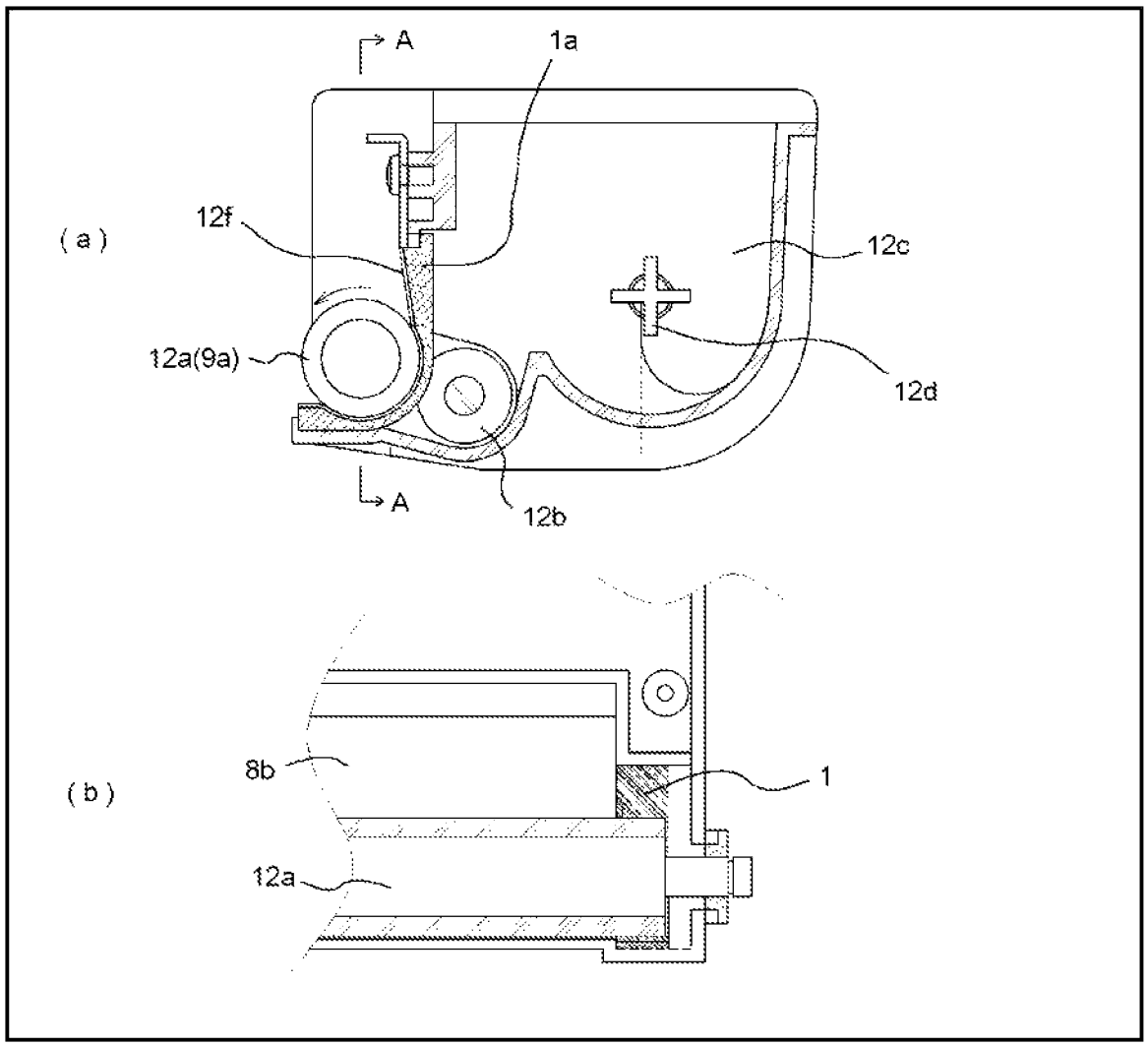

[FIG. 13]
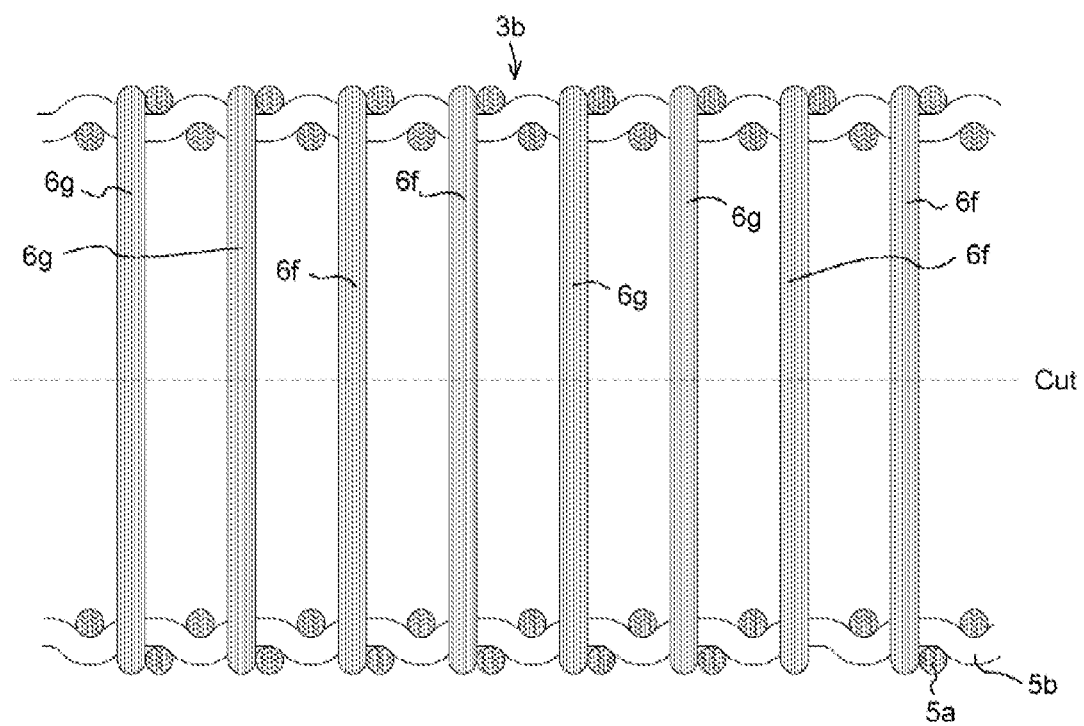

[FIG. 14]
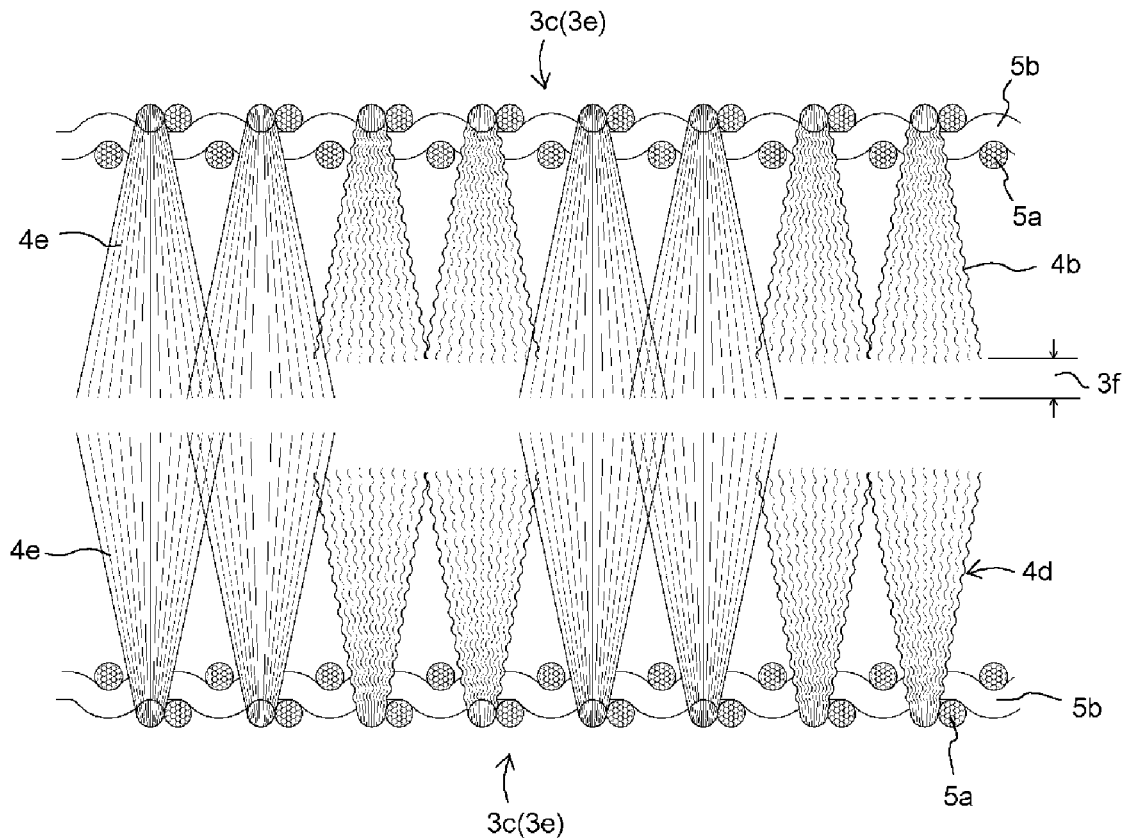
[FIG. 15]
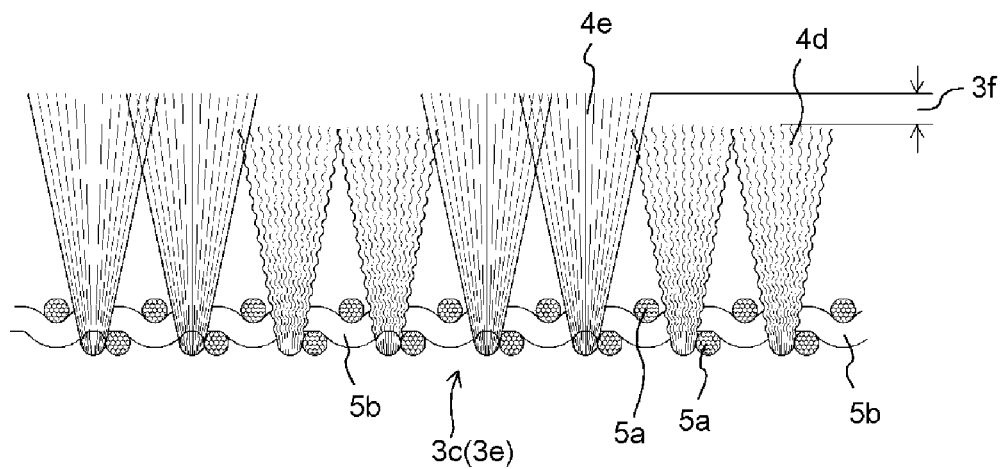

[FIG. 16]
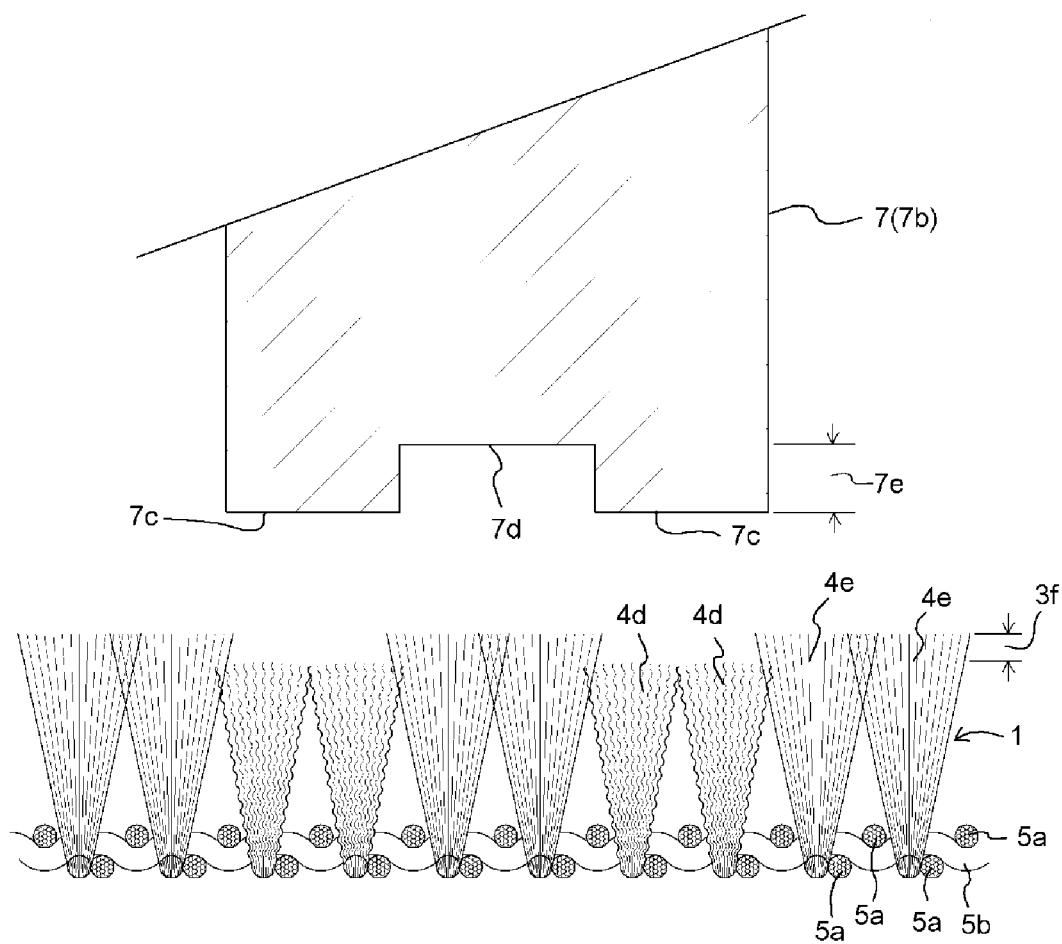

[FIG. 17]
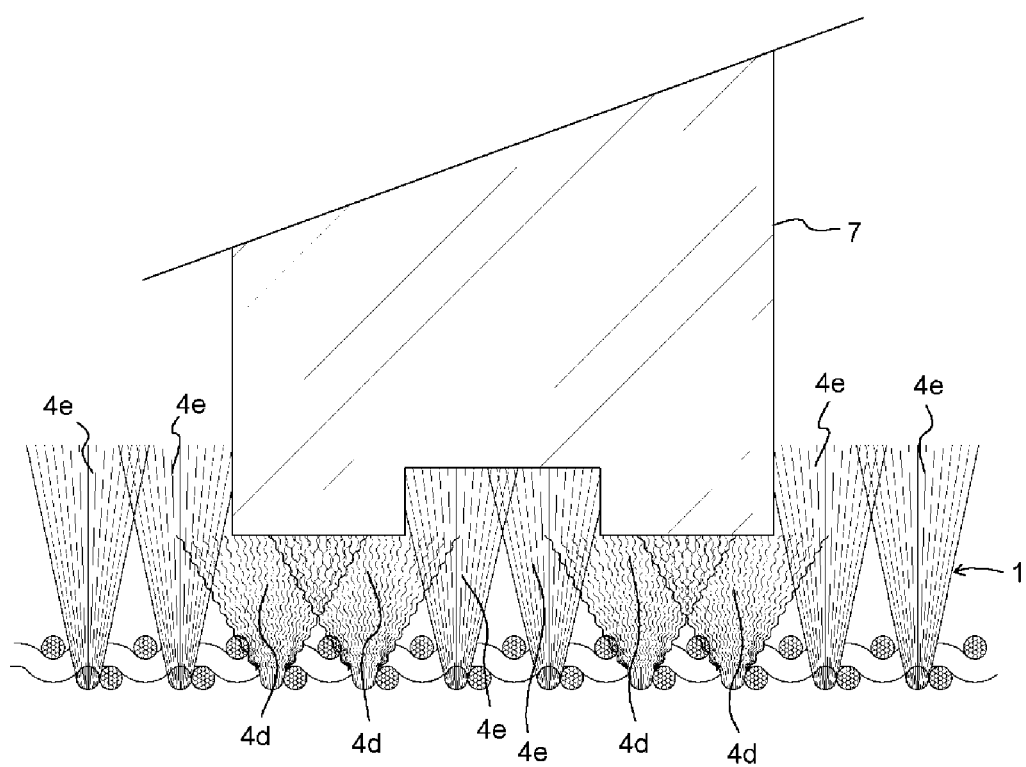

SEALING MATERIAL COMPRISING CUT PILE WOVEN FABRIC

TECHNICAL FIELD

The present invention relates to a sealing material used to prevent toner or other such powder from leaking to the exterior from an end or from a shaft or the like of a powder carrier which comprises a straight body or a rotating body in an apparatus that utilizes powder, such as, for example, a copy machine, printer, or other such electrophotographic image forming apparatus.

BACKGROUND ART

Conventional sealing materials include sealing materials comprising foamed bodies, sealing materials comprising nonwoven fabrics, sealing materials comprising implanted fiber bodies, sealing materials comprising woven pile fabrics or other such woven fabrics, sealing materials comprising knit fabrics, sealing materials comprising rubber materials, and so forth. For example, such sealing materials are often used as end seal materials in powder carriers where surfaces of powder carriers constituting rotating bodies are partially exposed.

With respect to such sealing materials, a sealing material comprising woven pile fabric formed as a result of the overlapping of weft yarn and warp yarn constituting ground yarn has, for example, been proposed as an end seal material for a powder carrier which is a rotating body that comprises woven pile fabric which prevents leakage of toner, i.e., powder, in an electrophotographic image forming apparatus (e.g., see Patent Reference No. 1).

Moreover, a powder sealing material has been proposed which comprises knit pile fabric that is knit fabric having pile in which stretchability and loss of fibers from the knit fabric are controlled, and in which flow of toner, i.e., powder is furthermore controlled, and in which leakage of powder to the exterior is prevented (e.g., see Patent Reference No. 2).

Moreover, a sealing member has been proposed which comprises stripes in a pattern of bands having no pile which is a structure that makes efficient use of resources, permitting attainment of high performance as a seal while being a member that uses little yarn, and which is constituted from few operations, without need for fiber grooming operations to cause inclination of pile or shearing operations to achieve uniform pile height, and in which there is no production of raggedness during use, and which is therefore capable of being used in stable fashion, there being no cause for concern with respect to loss of fibers, and which moreover has excellent wear resistance, and which is an extremely high-quality sealing member, there being cause for concern with respect to detachment (e.g., see Patent Reference No. 3).

However, in recent years, as a result of the fact that problems with seal characteristics have become more prominent due to the fact that there have been advances in achieving decreased particle diameter in powder constituting toner due to the trend toward improved energy conservation, and there have been advances in achieving increased speed in devices, there has been increased focus on the problem of achieving good seal characteristics with respect to such powders, and on the problem of the heat due by friction at, e.g., the rotating body, i.e., roller, or powder carrier which contacts the sealing material, and so forth.

In particular, with respect to sealing materials for toners in electrophotographic image forming apparatuses, due to the trend in recent years toward improved image quality and to reduce the amount of toner consumed, in accompaniment to increase in speed of the device in addition to the decrease in toner particle diameter, there have been advances in achieving reduction in the melting point of the toner, as a result of which the phenomenon of softening of toner due to heat produced by friction as a result of contact between sealing materials and low-melting-point toners as well as problems occurring in accompaniment thereto have become more prominent. For this reason, as prior art, a sealing material has been proposed which is a sealing material comprising woven pile fabric, and which is such that at least a portion of the pile yarn that makes up the pile is formed in such fashion as include a material having heat-dissipating functionality (e.g., see Patent Reference No. 4). However, this sealing material cannot be said to be a sealing material that is adequate in terms of ability to accommodate increased speed and decreased particle diameter of toner.

PRIOR ART REFERENCES

Patent References

PATENT REFERENCE NO. 1: Japanese Patent Application Publication Kokai No. 2003-223047
PATENT REFERENCE NO. 2: Japanese Patent Application Publication Kokai No. 2010-128449
PATENT REFERENCE NO. 3: Japanese Patent No. 5636044
PATENT REFERENCE NO. 4: Japanese Patent Application Publication Kokai No. 2014-137400

SUMMARY OF INVENTION

Problem to be Solved by Invention

A problem to be solved by the invention under application is to provide a sealing material that comprises woven pile fabric of novel structure which reduces heat due to friction produced by contact with a rotating body, i.e., roller or shaft which is a rotating body or a straight body in the context of an apparatus for utilization of toner or other such powder and which prevents leakage of powder comprising fine particles from the rotating body, i.e., roller or shaft which is a rotating body or the straight body such an apparatus.

Means for Solving Problem

As means in accordance with the present invention for solving the foregoing problems, a first means is a sealing material comprising cut pile woven fabric having stripes characterized in that it is a sealing material that prevents leakage of powder from a rotating body or a straight body, woven pile fabric constituting said sealing material being in a woven pattern forming a pattern of bands, i.e., stripes (hereinafter "stripes"), woven from pile yarn comprising a plurality of filaments, pile of the woven pile fabric formed by said woven pattern being cut to a prescribed length, being cut pile woven fabric in which the stripes are formed, the cut pile woven fabric in which said stripes are formed being such that the stripes are formed on a front surface of the woven fabric by the cut pile, and having steps due to difference in thickness of the cut pile, and in that it is a sealing member having a length of the cut pile that is cut to a prescribed length which is a cut pile length that is greater than a spacing of a pitch at a pile supporting yarn that supports the pile.

A second means is the sealing material comprising cut pile woven fabric having stripes according to the first means characterized in that the cut pile woven fabric at which the pile is cut to the prescribed length and at which the stripes are formed is a woven pattern in which two or more types of respective pile yarns of different characteristics form columnar banded stripes, being cut to prescribed length, and the front surface of the cut pile woven fabric is such that the stripes are formed by cut pile comprising the different pile yarns, being the cut pile woven fabric at which the steps are formed due to the difference in thickness of the cut pile, and the length of the cut pile which is cut to the prescribed length is greater than the spacing of the pitch of the yarn that supports the pile yarn.

A third means is the sealing material comprising the cut pile woven fabric having the stripes according to the first means or the second means characterized in that the cut pile which is cut to the prescribed length is groomed in one identical direction and is made to be inclined by grooming means, with the pile supporting yarn serving as pivot, and the groomed cut pile causes the front surface of the cut pile woven fabric to have the steps comprising the cut pile at the stripes or the steps due to difference in elasticity of the cut pile at the plurality of the cut pile yarns that form the stripes, this cut pile being groomed, and the cut pile woven fabric having the steps at the stripes which are made to be inclined is used to cause the sealing material for prevention of leakage of powder to be formed in a prescribed shape, or the sealing member comprising the cut pile woven fabric having the steps at the stripes that have been made to be inclined at the cut pile and a laminating member are laminated to form the sealing material of the prescribed shape, being the sealing material for prevention of leakage of the powder from the rotating body or the straight body.

A fourth means is a sealing material comprising cut pile woven fabric having stripes characterized in that it is a sealing material that prevents leakage of powder from a rotating body or a straight body, wherein a sealing member that makes up the sealing material is a sealing member comprising the cut pile woven fabric, this sealing member is a plurality of pile yarns of different pile yarn characteristics, these respective pile yarns of different characteristics comprise a prescribed number of columns of alternating arrangement, being cut pile woven fabric having the stripes comprising cut pile of prescribed length comprising the stripes which are continuous in one direction, being a sealing member comprising cut pile woven fabric which is such that cut pile of the cut pile woven fabric having these stripes is made to be inclined in one direction by grooming means, with pile supporting yarn that supports the pile serving as pivot, and a front surface of the cut pile woven fabric is such that a plurality of cut pile yarns of different diameter cause the front surface to have steps comprising projections and recesses comprising the stripes or cut pile woven fabric having steps comprising projections and recesses forming the stripes wherein pile yarn comprises a plurality of cut pile yarns of different stretchabilities, or being sealing member comprising cut pile woven fabric which is such that a plurality of cut pile yarns of different material cause the front surface to have the steps comprising projections and recesses at the stripes or cut pile woven fabric which is such that pile yarns of different difference in elasticity cause the front surface to have difference in elasticity comprising projections and recesses comprising the stripes, being a sealing member for prevention of leakage of powder of prescribed shape comprising such sealing member comprising the cut pile woven fabric which is striped or such sealing member comprising the cut pile woven fabric which is striped and a laminating member, being sealing material for prevention of leakage of powder from the rotating body comprising this sealing member.

A fifth means is sealing material comprising cut pile woven fabric having stripes characterized in that it is a sealing material that prevents leakage of powder from a rotating body or a straight body, being a sealing member which is woven pile fabric comprising stripes at which pile is made to be inclined or is groomed, the pile yarn that forms the stripes being multifilament pile yarn comprising a multiplicity of filaments that form pile, the cut pile woven fabric comprising the stripes comprising a plurality of the pile yarns, wherein pile yarns for which the number of filaments forming these pile yarns is different are used, being sealing member comprising cut pile woven fabric comprising cut pile constituting stripes of respectively different pile diameters, cut pile woven fabric constituting stripes comprising pile yarns which are of different stretchabilities and which are multifilaments at which the number of filaments twisted therein is different, cut pile woven fabric constituting stripes comprising pile yarns at which materials of filaments are different and at which percentage elongations and elasticities of the respective pile yarns are different, cut pile woven fabric constituting stripes comprising pile yarns at which filament cross-sections are different, or cut pile woven fabric constituting stripes comprising pile yarns at which pile yarn filaments are of different diameter, cut pile woven fabric having steps at which the front surface of such cut pile woven fabric comprises projections and recesses which are stripes, or cut pile woven fabric comprising stripes and such that the front surface of the cut pile woven fabric constituting the stripes due to difference in elasticity of a plurality of pile yarns at the cut pile woven fabric constituting the stripes has the difference in elasticity at respective pile regions which are stripes, or being a sealing member for prevention of leakage of powder of prescribed shape which comprises a laminating member laminated to such sealing member, being a sealing material for prevention of leakage of powder from the rotating body or the straight body comprising said sealing member.

A sixth means is the sealing material comprising the cut pile woven fabric having stripes according to the fourth means or the fifth means characterized in that the sealing member comprising the cut pile woven fabric has the steps due to the stripes which themselves comprise the cut pile at which the cut pile yarn which forms the cut pile woven fabric has been made to be inclined or has been groomed, and furthermore is a sealing member for prevention of loss of fiber from the cut pile which is such that means for prevention of loss of fiber from the cut pile of the cut pile woven fabric having the stripes at the woven pile fabric makes use of at least one means among means for preventing loss of fiber making use of thermal fusing of the cut pile that has been made to be inclined, which is to say groomed, due to cut pile supporting yarn that contains thermally fused fiber which is ground yarn that supports the cut pile, or means for preventing loss of fiber making use of solidification of coating agent applied to the back surface of said cut pile woven fabric after the cut pile has been groomed, and means for preventing loss of fiber making use of solidification or coagulation of adhesive or hot-melt-type adhesive applied to the back surface of the cut pile woven fabric, being a sealing material for prevention of leakage of powder from a rotating body or a straight body that comprises said sealing member.

A seventh means is the sealing material comprising the cut pile woven fabric having the stripes according to any one of the first through sixth means characterized in that the sealing material for prevention of leakage of the powder from the rotating body or the straight body comprising the sealing member is such that the sealing member for prevention of leakage of the powder from the rotating body or the straight body comprises cutting or punching of the sealing member which is such that, in contacting an end of the powder carrier which is the rotating body or the straight body, an angle of the cut pile at the front surface of the sealing member or a longitudinally oriented angle comprising the stripes relative to a direction of rotation of the rotating body at the powder carrier or a direction in which contact is made with the straight body, is made to be angle in a direction such as will cause return of the powder by causing the powder to be directed opposite to a direction in which it would leak to the exterior, so that the powder does not leak to the exterior from the end of the powder carrier.

An eighth means is the sealing material comprising the cut pile woven fabric having the stripes according to the seventh means characterized in that the sealing member for prevention of leakage of the powder from the rotating body or the straight body comprising the cutting or the punching of the sealing member is sealing member comprising cut pile woven fabric in which cut pile has been groomed or has been made to be inclined in one direction or sealing member comprising cut pile woven fabric having steps comprising stripes that have been groomed or that have been made to be inclined in one direction, a laminating member laminated to the back surface of this sealing member is a member selected from among foamed body, elastomer, thermoplastic resin, plastically deformable material, and metal elastic material, being a sealing member that has been made suitable for prevention of leakage of the powder upon application of prescribed load to this member, being sealing material for prevention of leakage of the powder from the rotating body or the straight body comprising this sealing member.

A ninth means is the sealing material comprising the cut pile woven fabric having the stripes according to the eighth means characterized in that the sealing member comprising the cut pile woven fabric having the steps comprising the stripes that have been groomed or that have been made to be inclined in the one direction is a sealing member that is formed in a prescribed shape of a sealing member or that is laminated to the laminating member to form a sealing member of prescribed shape, being sealing material for prevention of leakage of the powder from the rotating body or the straight body or being end seal material for prevention of leakage of the powder from a powder carrier at an electrophotographic image forming apparatus comprising this sealing member.

A tenth means is the sealing material comprising the cut pile woven fabric having the stripes according to the ninth means characterized in that the sealing member that is formed in the prescribed shape or that is laminated to the laminating member to form the sealing member of the prescribed shape is sealing member at which an ester wax film which is wax or paraffin or fatty acid salt comprising solid matter which is metallic soap or bar soap has been rubbingly applied to the front surface of the sealing member, being sealing material for prevention of leakage of the powder from the rotating body or the straight body comprising this sealing member.

Benefit of Invention

The present invention being a sealing material comprising a sealing member employing cut pile woven fabric, conventional cut pile woven fabric has been such that the front surface of the cut pile is constituted as to be uniform, and has been constituted such that by keeping the pile grooming angle within a given range, a sealing material with little collapse of fiber was produced. However, the present invention is such that by causing cut pile to be made to lean over at a given angle, with the pile supporting yarn that supports the pile yarn serving as pivot, despite the fact that the pile comprises filament fiber at low density that has been groomed in such fashion as to cause pile yarns to mutually approach or come in contact, it is possible to achieve seal characteristics that are not inferior to those of high-density pile, as well as improvement in seal characteristics at the base, this having been a problem conventionally, and to also at the same time improve stability with respect to collapse of fiber at pile. In addition, rotation about the foregoing pivot constituted by the pile supporting yarn that supports the pile yarn permits production of stripes comprising woven pile fabric formed by arrangement of pile yarn in columnar fashion, grooming of pile and the woven pile fabric at these stripes making it possible to cause the front surface of the sealing member to have a surfacial state such that there are steps at the stripes, or use of different materials at respective columnar regions causing the woven pile fabric to be provided with a difference in elasticity due to the filament fibers, as a result of which it is possible to reduce heat due to friction which is produced by pressure of contact with pile, and it is a sealing material that makes it possible to obtain a benefit whereby seal characteristics are improved.

BRIEF DESCRIPTION OF DRAWINGS

FIG. 1 is a plan view showing example of pile weave pattern constituting stripes in accordance with the present invention.

FIG. 2 is an example of woven pile which is woven in the pattern shown in FIG. 1 and that has been sheared so as to be a given thickness, (a) being a plan view, (b) being a front view, (c) being a left side view, and (d) being a right side view.

FIG. 3 is an example of situation in which pile yarn has been groomed by grooming means, (a) being a plan view, (b) being a front view, (c) being a left side view, and (d) being a right side view.

FIG. 4 is a schematic diagram showing woven pile structure in simplified fashion. (a) being a drawing in which cut pile stands upright, and (b) being a drawing in which cut pile has been groomed.

FIG. 5 is a schematic diagram of structure in which pile yarn at woven pile comprises filaments, (a) being a drawing in which cut pile yarn stands upright, and (b) being a drawing in Which cut pile yarn has been groomed.

FIG. 6 is a schematic diagram of structure in which there are gaps of diameter of powder between pile yarns at woven pile, (a) being a drawing in which cut pile stands upright, and (b) being a drawing in which cut pile has been groomed, and (c) being a drawing in which cut pile yarns are at grooming angle 9.

FIG. 7 is an example of seal location comprising cut pile woven fabric having stripes that have been groomed, (a) being a plan view, (b) being a front view, (c) being a left side view, and (d) being a right side view.

FIG. 8 is an example of sealing member comprising woven pile fabric having stripes made up of one type of pile, (a) being a plan view. (b) being a front view, (c) being a left side view, and (d) being a right side view.

FIG. 9 is a sectional view showing example of sealing material at which a sealing member has been provided with a laminating member.

FIG. 10 is an example of sheet stock formed by lamination of laminating member to sealing member. (a) being a plan view, (b) being a front view, (c) being a left side view, (d) being a right side view, (a') being a plan view of the hole that remains when the shape of a sealing material has been cut out from cut pile woven fabric, and (e) being a plan view of sealing material that has been cut out from cut pile woven fabric.

FIG. 11(a) is a side view of a test apparatus for evaluation of sealing material comprising a powder leakage test container mounted on an angle bar of a vibration source, FIG. 11(b) being a plan view showing the orientation of sealing material serving as sample, and FIG. 11(c) being a front view.

FIG. 12 is an example employing sealing material as end seal material at develop apparatus in electrophotographic image forming apparatus, (a) being develop apparatus having develop roller, supply roller, and toner agitator. (b) being a side view as viewed in the direction of the arrows at section A-A at (a), being a drawing showing a partial front view of the sectioned develop roller and toner agitator as viewed from a vantage point toward the sectioned develop roller.

FIG. 13 is a plan view showing arrayal of pile yarns at double-woven pattern in which both warp and weft are double-woven. Furthermore, also is double-woven pattern in which both warp and weft are double-woven at woven pile fabric comprising crimped-filament column A pile yarn and straight-filament column B pile making use of tension in pile yarn between pile supporting yarn for warp yarn and weft yarn which are ground yarn.

FIG. 14 is a plan view showing sealing members comprising shortened crimped filaments at column A pile yarn and straight filaments at column. B pile following removal of tension in pile yarn upon cutting at center of woven fabric having double-woven pattern in FIG. 13 to form upper and lower thereof.

FIG. 15 is a drawing showing sealing member having steps.

FIG. 16 is a drawing showing shape of member being sealed which has steps, and sealing material that accommodates shape of member being sealed.

FIG. 17 is a drawing in which sealing material having steps at FIG. 16 is made to come in contact with shape of steps of member being sealed that has steps.

EMBODIMENTS FOR CARRYING OUT INVENTION

Embodiments of the present invention are described with reference to tables and drawings. An example of a woven pattern 3a comprising stripes in accordance with the present invention is presented. This woven pattern 3a is woven pile fabric 3b having pile 4. This woven pattern 3a is such that, as pile yarn 6 comprising filament forming pile 4, two types of pile yarn 6 comprising column A pile yarn 6a and column B pile yarn 6b are used, being supported by warp yarn 5a and weft yarn 5b which are pile supporting yarn 5 constituting ground yarn that supports the pile, two columns of column A pile yarn 6a and two columns of column B pile yarn 6b being respectively arranged in alternating fashion through the spaces between warp yarn 5a and weft yarn 5b, in perpendicular fashion with respect to warp yarn 5a and weft yarn 5b, as can be seen in FIG. 1, to constitute woven pattern 3a which forms stripes. Note that whereas in this example woven pattern 3a is made up of two types such that there are two columns of column A pile yarn 6a and two columns of column B pile yarn 6b, the number of columns may be arbitrarily constituted as necessary; and furthermore, it is also possible to constitute woven pattern 3a from a single type of pile yarn 6.

Woven pile fabric 3b having pile yarn 6 at woven pattern 3a forming stripes is obtained by forming a woven pattern from two types, i.e., the two columns comprising column A pile yarn 6a and the two columns comprising column B pile yarn 6b at FIG. 1, woven pile fabric 3b with this woven pattern 3a being made to be of prescribed thickness as a result of shearing (trimming), as a result of which pile yarn 6 is cut to cut pile length 4c, which is a prescribed length, so as to produce cut pile 4a at column A and cut pile 4b at column B. Cut pile woven fabric 3c having this cut pile 4a at column A and this cut pile 4b at column B is shown at FIG. 2. As can be seen at FIG. 2, during shearing, cut pile 4a at column A and cut pile 4b at column B are such that the fibers thereof are more or less upright, use of uncrimped pile yarn 6 of different properties making it possible for the thickness of cut pile woven fabric 3c to uniformly be made uniformly even at cut pile length 4c as a result of shearing. It should be noted that it is preferred, at the time of shearing, that pile yarn 6 which forms cut pile 4 be soft-twist filament 9 so that spreading of fibers will be satisfactory.

The respective strands of cut pile at cut pile 4a at column A and cut pile 4b at column B shown in FIG. 2 are straight fibers, the situation that exists when cut pile yarn 6d at column A and cut pile yarn 6e at column B have been groomed so as to be uniformly inclined in a given direction being shown in FIG. 3. Following shearing, grooming means (i.e., inclining means) causes cut pile yarn 6d at column A and cut pile yarn 6e at column B to be groomed in more or less the same direction as shown in FIG. 3, with weft yarn 5b at pile supporting yarn 5 which is the ground yarn serving as pivot, so as to be groomed in such fashion as to approximate grooming angle $\theta_0$ at (b) in FIG. 4. That is, FIG. 3 shows the situation that exists when cut pile yarn 6d at column A and cut pile yarn 6e at column B are groomed from bottom to top, with weft yarn 5b serving as pivot, the fibers being groomed in such fashion as to approach or come in contact with the cut pile yarn therebelow and thereabove. Note that the foregoing grooming means is a brush roller, pressure roller, compression belt, or the like, pressing by such means in one direction causing the fibers to respectively be made to incline in one direction to an extent which corresponds to the properties of the filaments. Furthermore, as means for causing spreading of fibers at the cut pile to be satisfactory, it is more preferred that this be carried out using a brush or the like. It should be noted that where pile supporting yarn 5 at cut pile yarn 6d at column A and cut pile yarn 6e at column B includes thermally fusible yarn, following grooming of cut pile yarn 6d at column A and cut pile yarn 6e at column B, pile supporting yarn 5 may be heated so that pile supporting yarn 5 and pile yarn 6 at cut pile yarn 6d at column A and cut pile yarn 6e at column B, are, due to the thermally fusible yarn that is included in pile supporting yarn 5, made to maintain their groomed state and at the same time loss of fibers from the pile yarn is prevented. On the other hand, where pile supporting yarn 5 does not include thermally fusible yarn, following grooming of cut pile yarn 6d at column A and cut pile yarn 6e at column B, the back surface of cut pile woven fabric 3e which has steps is coated with resin to prevent loss of fibers from pile yarn 6. Depending on the extent to which loss of fiber has occurred at the pile, such prevention of loss of fibers might be such that, in combination with prevention of loss of fiber at the pile, measures are taken as necessary to prevent loss of fiber so as to prevent loss of any more pile than has already occurred. As described above, in accordance with the present invention, pile yarn 6 is used which comprises pile yarn 6a at column A and pile yarn 6b at column B, which are of different pile diameters, to achieve a constitution with cut pile woven fabric 3c comprising stripes, which is groomed by grooming means, and as shown at (b) in FIG. 3, at cut pile woven fabric 3e comprising stripes, steps 3f are formed in alternating fashion by sets of two columns of groomed fiber height $H_2$ at column A cut pile yarn 6d obtained by cutting column A pile yarn 6a and groomed fiber height $H_1$ at column B cut pile yarn 6e obtained by cutting column B pile yarn 6b. As has been described above, the present invention makes it possible, by using pile yarn 6 which comprises column A pile yarn 6a and column B pile yarn 6b, which are of a plurality of different pile diameters, to form cut pile woven fabric 3c comprising stripes, and makes it possible, by grooming column A cut pile yarn 6d and column B cut pile yarn 6e, with pile supporting yarn 5 serving as pivot, to form steps 3f comprising stripes at the front surface of cut pile woven fabric 3e.

The principle by which steps 3f comprising stripes are formed at the front surface of cut pile woven fabric 3e is explained by means of the respective schematic diagrams at FIG. 4, FIG. 5, and FIG. 6. As shown in simplified fashion by means of the schematic diagrams in FIG. 4 and FIG. 6, cut pile woven fabric 3e of the present invention is made up of weft yarn 5b or warp yarn 5a at pile supporting yarn 5 which supports cut pile yarn 6c, and warp yarn 5a or weft yarn 5b which prevents or mitigates collapse of cut pile yarn 6c to the side. FIG. 5 shows how cut pile yarn 6c is made up of filament(s) 9.

As shown at (a) in FIG. 4 or at (a) in FIG. 5, taking the diameter of pile yarn 6 to be $\Phi_p$, taking the diameter of pile supporting yarn 5 to be $\Phi_s$, taking the average particle diameter of powder 8 to be $\Phi_t$, and taking the pitch between pile supporting yarns 5 to be L, cut pile woven fabric 3e in accordance with the present invention is such that, following shearing, cut pile 4 or cut pile yarn 6c is in a state in which it is more or less vertically erect, as shown at (a) in FIG. 4 or at (a) in FIG. 5. Cut pile 4 or cut pile yarn 6c is supported by pile supporting yarn 5, and is groomed by the grooming means so as to approach or come in contact with cut pile yarn 6c upstream and downstream therefrom, with pile supporting yarn 5 serving as pivot. At this time, $\Phi_s$, which is the diameter of pile supporting yarn 5 that supports cut pile yarn 6c, or pitch L, which is the distance between pile supporting yarns 5, 5 at cut pile yarn 6c, causes grooming angle $\theta_0$, which is the angle of inclination of cut pile 4 or cut pile yarn 6c, to be an angle such as will cause cut pile yarn 6c which is upstream in the direction of motion of powder 8 to approach cut pile yarn 6c which is downstream in the direction of motion of powder 8, or to be an angle such as will cause cut pile yarn 6c which is upstream in the direction of motion of powder 8 to come in contact with cut pile yarn 6c which is downstream in the direction of motion of powder 8. Cut pile 4 or pile yarn 6 is groomed to this grooming angle $\theta_0$. By causing occurrence of such a state in which grooming angle $\theta_0$ is established, it is possible to obtain cut pile 4 or cut pile yarn 6c in which grooming angle $\theta_0$ is stable. As shown at (a) or (b) in FIG. 4, or at (a) or (b) in FIG. 5, grooming angle $\theta_0$ is determined by $r_0$, which is the radius at the base of cut pile 4 or cut pile yarn 6c, and by ½ of pitch L (L/2), which is the distance between pile supporting yarns 5. $r_0$ at Formula (1) is the length which is the sum of the diameter $\Phi_p$ of pile yarn 6 plus ½ of the diameter $\Phi_s$ of pile supporting yarn 5; i.e., the radius of gyration. Formula (2) gives the rotatable grooming angle $\theta_0$ as calculated from the radius of gyration $r_0$ and the pitch of pile supporting yarns 5. And at Formula (3), height H following grooming of cut pile yarn 6c is calculated from grooming angle $\theta_0$ and cut pile length 4c.

$$r_0 = \Phi_p + (\Phi_s/2) \qquad (1)$$

$$r_0/(L/2) = \sin\theta_0 \qquad (2)$$

$$H = \sin\theta_0 x$$

In addition, as an example of use of two types of pile yarn, as shown in FIG. 3, taking the pile diameter of column A cut pile yarn 6d to be $\Phi_{6d}$, and taking the pile diameter of column B cut pile yarn 6e to be $\Phi_{6e}$, in a constitution in which the relationship between pile diameters is such that $\Phi_{6d} > \Phi_{6e}$, yarn diameter $\Phi_s$ of the pile supporting yarn which is weft yarn is the same for both column A and column B, the relationship between the radius of gyration $r_{6d}$ of column A cut pile yarn 6d and the radius of gyration $r_{6e}$ of column B cut pile yarn 6e is such that $r_{6d} > r_{6e}$, the grooming angle $\theta_{6d}$ of column A cut pile yarn 6d is greater than the grooming angle $\theta_{6e}$ of column B cut pile yarn 6e, in a situation in which the thickness $H_2$ following grooming of column A cut pile yarn 6d and the thickness $H_1$ following grooming of column B cut pile yarn 6e respectively employ multifilament pile yarn(s) comprising more or less straight fibers, it is possible to form cut pile woven fabric 3e with stripes having steps 3f in which cut pile length 4c following shearing is approximately the same length, but thickness $H_2$ following grooming of column A cut pile yarn 6d is greater than height $H_1$ following grooming of column B cut pile yarn 6e, steps 3f being formed by virtue of the difference ($H_2-H_1=3f$) therebetween.

Therefore, by using pile yarn 6 of a plurality of different pile yarn diameters in accordance with Formula (1), Formula (2), and Formula (3), it is possible to achieve the respective grooming angles, and by causing cut pile yarn 6c which has been subjected to shearing so that the different pile yarns are the same height to be groomed to an angle such as will cause the cut pile yarns, the angles of which are rotatable, to mutually approach or come in contact, it is possible to easily form cut pile woven fabric 3e with stripes having steps 3f having thicknesses attributable to the respective cut pile yarns 6c. Moreover, by grooming the grooming angle to the rotatable angle of the cut pile yarn, it is possible to minimize the gap at the base, and it is possible to prevent leakage of fine powder.

On the other hand, as shown in FIG. 6, FIG. 6 is a drawing for explaining the conditions under which leakage of powder 8 occurs which includes the average particle diameter $\Phi_t$ of powder 8. Based on the results of testing, it was found that if there is a gap sufficient to allow one particle of powder 8 to enter the space between mutually adjacent strands of groomed cut pile 4 or cut pile yarn 6c, i.e., if there are gaps sufficient to allow two particles of powder 8 to enter the spaces to either side of a single strand of groomed cut pile 4 or cut pile yarn 6c, then powder 8 will pass through such spaces and there will be leakage thereof. Accordingly, as shown at (b) in FIG. 6, the formulas for radius r at the base of groomed cut pile 6 or groomed cut pile yarn 6c may be expressed as:

$$r = \Phi_p + (\Phi_s/2) + \Phi_t \qquad (4)$$

$$r/(L/2) = \sin\theta \qquad (5).$$

Accordingly, for angles smaller than the grooming angle θ at cut pile yarn 6c for which the foregoing Formulas (4) and (5) are satisfied, it will be possible to prevent leakage of powder 8, i.e., powder 8 which is toner 8a at develop roller 12a of develop apparatus 12 at electrophotographic image forming apparatus 11, therefrom. Note that when a plurality of pile yarns 6 are employed it is necessary that at least one cut pile yarn 6c be groomed to an angle smaller than grooming angle θ, it being the case that formation thereof may be achieved by causing cut pile woven fabric 3c to be groomed or the condition(s) may be satisfied through attachment to the apparatus and compression thereof.

With regard to formation of groomed cut pile woven fabric 3e with stripes, which is one aspect of the invention under application, pile yarn 6 at woven pile fabric 3b employing two different pile yarn diameters is subjected to shearing to form cut pile woven fabric 3c with stripes. Here, distance L between pile supporting yarn 5 which supports pile yarn 6 and the pile supporting yarn 5 which is adjacent thereto is a condition which is one of the machine settings at the loom on which cut pile woven fabric 3c is woven. By therefore causing cut pile woven fabric 3c to be woven with the same machine settings conditions at mutually adjacent portions, and causing weaving to be carried out using pile yarn 6 of different pile diameters, as grooming angle $\theta_{4a}$ at cut pile 4a at column A and grooming angle $\theta_{4b}$ at cut pile 4b at column B or grooming angle $\theta_{6d}$ at column A cut pile yarn 6d and grooming angle $\theta_{6e}$ at column B cut pile yarn 6e will following grooming by grooming means be formed in such fashion as to have different grooming angles θ, it will be possible to cause these to be formed in such fashion that there are different grooming angles θ at mutually adjacent portions following grooming, as a result of which the front surface of cut pile woven fabric 3e will have steps 3f comprising stripes. Accordingly, this cut pile woven fabric 3e comprising cut pile woven fabric 3e having steps 3f may be used to form sealing member 2. Moreover, while not shown in the drawings, by using pile yarn 6 of a greater number of different pile diameters to form woven pile fabric 3b, it is also possible to form a sealing member 2 in which the cross-section is sloped.

Furthermore, even with pile yarn 6 of the same pile diameter, because it will be possible by decreasing or increasing the diameter of the filament(s) 9 that make up pile yarn 6 to vary the elasticity of pile yarn 6, it will be possible to form the front surface of cut pile woven fabric 3e with steps having different elasticity and comprising stripes. Moreover, by using filaments 9 of the same diameter but of different elasticities, it will be possible to cause sealing member 2 to have different elasticities despite the fact that the diameter of cut pile 4 is the same.

One aspect of the invention under application is sealing material 1 which has sealing member 2 comprising cut pile woven fabric 3e that has been groomed in one direction, and, by using a plurality of pile yarns 6 which are such that the pile yarns 6 are pile yarns 6 of different diameters, it is possible to form cut pile woven fabric 3e which has stripes, grooming of cut pile 4 being carried out in such fashion that cut pile yarn 6c which is upstream in the direction of motion of powder 8 which is centered on pile supporting yarn 5 that supports cut pile yarn 6c approaches or comes in contact with cut pile yarn 6c which is downstream therefrom, the constitution being such that the gap at the base of cut pile 4 is minimized, and the constitution making it is possible to prevent leakage of toner 8a which is powder 8 from the base. Moreover, it is possible to achieve different reactive-force-providing elasticities at sealing member 2 by means of filament(s) at cut pile woven fabric 3e comprising stripes by using materials in which filament diameters are different or pile yarns 6 in which filament materials are different and comprising stripes and a constitution in which there are steps 3f at the front surface and comprising stripes.

In addition to the foregoing, by employing soft-twist pile yarn 6, it is possible to achieve a constitution in which filament(s) 9 of cut pile yarn 6c following shearing are spread out relative to pile supporting yarn 5 which supports pile yarn 6. Accordingly, it is possible to reduce the grooming angle θ of cut pile 4, and it is possible as shown at (c) in FIG. 6 to cause formation of a state in which there is no gap between mutually adjacent strands of cut pile 4. Similarly, by reducing the diameter of pile supporting yarn 5 which supports pile yarn 6 and by increasing the distance between mutually adjacent pile yarns 6, it is possible to reduce grooming angle θ. Conversely, where it is desired that grooming angle θ be increased, by increasing the diameter of pile supporting yarn 5 which supports pile yarn 6 that is constituted from filament(s) 9 and by decreasing the distance between mutually adjacent pile yarns 6, it is possible to increase grooming angle θ.

In addition, to prevent loss of cut pile 4 from cut pile woven fabric 3e having cut pile 4 which is groomed, sealing member 2 comprising cut pile woven fabric 3e may be formed in such fashion that prevention of loss of cut pile yarn 6c by virtue of pile supporting yarn 5 which is thermally fused as a result of application of heat is carried out by causing cut pile woven fabric 3e to be formed in such fashion that pile supporting yarn 5 which supports cut pile yarn 6c is made to contain thermally fusible yarn, in such fashion that prevention of loss of cut pile yarn 6c is carried out by virtue of impregnation by and curing of resin coating agent at back surface 2a of sealing member 2 comprising cut pile woven fabric 3e, in such fashion that prevention of loss of fiber is carried out by virtue of heating of, impregnation by, and solidification of hot melt adhesive at back surface 2a of sealing member 2 comprising cut pile woven fabric 3e, or the like.

An example of sealing member 2 comprising cut pile woven fabric 3e having steps having stripes which are groomed in accordance with the invention under application is shown in the schematic diagram at FIG. 7. At this schematic diagram, pile yarn 6 is constituted from two types thereof, these being groomed column A cut pile yarn 6d of low height and groomed column B cut pile yarn 6e of high height, this being an example in which two columns of column A cut pile yarn 6d and two columns of column B cut pile yarn 6e are repeated in alternating fashion to form sets of two columns of each. Weft yarn 5b of pile supporting yarn 5 supports pile yarn 6; on the other hand, warp yarn 5a of pile supporting yarn 5 prevents cut pile 4 from collapsing to the side. Note that where it is said above that there are sets of two columns, the number of column(s) comprised thereby may be chosen to be any desired number, and should be determined in accordance with the function of sealing member 2.

Next, an example of sealing member 2 comprising cut pile woven fabric 3e having steps having stripes in which one type of multifilament cut pile yarn 6d is groomed, which is one aspect of the invention under application, is shown in the schematic diagram at FIG. 8. At this schematic diagram, there are two mutually adjacent columns, pile yarn 6 being such that one type of cut pile 4, e.g., column A cut pile yarn 6d which is one type of cut pile 4, is in a groomed state. Moreover, in the space between these mutually adjacent two columns of one type of cut pile 4 and the next mutually adjacent two columns of one type of cut pile 4, a portion comprising only woven pattern 3a comprising warp yarns 5a of pile supporting yarn 5 and weft yarns 5b which intersect these warp yarns 5a is present. In addition, in the space between warp yarns 5a of the mutually adjacent two columns at this portion comprising woven pattern 3a, a woven pattern comprising only weft yarns 5b that intersect therewith is present. That is, there is a portion at which there is only woven pattern 3a having weft yarns 5b in which no column B cut pile yarn 6e is present. In addition, as shown at (b) in FIG. 8, step 3f is present between this portion comprising woven pattern 3a and the tip portions of the mutually adjacent two columns of cut pile yarn 6c. In this way, as shown in the schematic diagram at (a) in FIG. 8, sealing member 2 comprises cut pile woven fabric 3e in which cut pile woven fabric 3c having stripes comprising repetition of such constitution is groomed.

An example of a constitution in which the back surface of sealing member 2 at which prevention of loss of fiber at cut pile woven fabric 3e having steps having stripes which are groomed in accordance with the invention under application is carried out is laminated with foamed body 10a constituting laminating member 10 by way of adhesion 10b is shown in the schematic diagram at FIG. 9. Moreover, where necessary, the back surface of foamed body 10a constituting laminating member 10 might be made to have double-sided adhesive tape 10c which is an adhesive member, the back surface of foamed body 10a being laminated to the installation seat therebelow. In this way, the adhesive layer between sealing member 2 and laminating member 10 might be adhesive 10b, or might be double-sided adhesive tape or hot-melt material, not shown, or the like.

To cut sealing member 2 on which laminating member 10 is laminated to produce seal(s) 1, as laminating member 10 for cut pile woven fabric 3e having steps, elastomers, rubber materials, foamed bodies (sponges), and other such elastic bodies may be cited as examples. Furthermore, laminating member 10 may be a metal sheet or a resin sheet. Moreover, sealing member 2 of the invention under application may be cut as is to produce sealing material(s) 1. Where the bottom surface of such sealing material 1 is to be laminated to an installation seat therebelow, double-sided adhesive tape 10c or the like may be provided at the back surface of sealing member 2 or sealing material 1, and this may be laminated to the installation seat therebelow. An example of a situation in which cut pile woven fabric 3e at which sealing member 2 and laminating member 10 are laminated together is used, cut pile woven fabric 3e which has steps being cut at the desired powder control angle α which is the angle that controls the direction of flow of powder for the orientation of the stripes so as to achieve the desired orientation of cut pile yarn 6c and the size of the shape of cut pile yarn 6c, to obtain sealing material 1 that has the desired powder control angle α which is the angle that controls powder 8 for the desired orientation of the stripes and the size of the shape, is shown at (e) in FIG. 10.

Here, vibration testing apparatus 13 which carries out testing of leakage of toner that is powder 8 at sealing material 1 formed as a result of the foregoing cutting is shown at FIG. 11. As shown in FIG. 11(a), toner 8a is housed in toner box 13c which is retained by angle bar 13b to vibration source 13a, and sealing material 1 is applied to the bottom end of a side wall constituting cover 13d of toner box 13c, this being an apparatus that carries out testing of leakage of toner 8a past sealing material 1 which is the material 13e to be evaluated in accompaniment to vibration from the gap between the bottom wall of toner box 13c and sealing material 1 at the bottom end of this side wall. In such case, as shown in FIG. 11(b), in carrying out testing of leakage of toner 8a, filament powder control angle $\alpha_f$ is set to 45°, the direction of vibration 13g of vibration source 13a is moreover set so as to be the direction shown in FIG. 11(a), and the extent of vibration is detected by pickup sensor 13f.

The drawing at (a) in FIG. 12 shows a side view in which arranged at the left side is powder carrier chamber 8b having develop roller 12a which is a developer carrier roller, supply roller 12b being arranged to the right side thereof, and in which arranged at the right side is toner storage chamber 12c having agitator 12d which is a member for causing agitation of toner 8a. Note that sealing material 1 of the invention under application is employed as end seal material 1b of develop apparatus 12 in electrophotographic image forming apparatus 11, this being attached such that the orientation of the stripes at this end seal material 1b is in the direction of the arrow directed toward the upper left within powder carrier chamber 8b shown at (b) in FIG. 12, the direction of this arrow which is directed toward the upper left being the direction of flow of toner 8a which is powder 8.

An example of formation of cut pile woven fabric 3e having steps 3f comprising stripes without use of grooming means, under conditions such that sealing member 2 comprising cut pile woven fabric 3e in accordance with one aspect of the invention under application employs pile yarn 6 and woven pattern 3a of cut pile woven fabric 3c, will be described based on FIG. 13 and FIG. 14.

FIG. 13 is a section in the direction of the weft yarn at a time when weaving is carried out using a method in which a double-woven pattern in which both the warp and the weft are double-woven is employed to make pile. Woven pattern 3a comprising warp yarn 5a and weft yarn 5b of pile supporting yarn 5 constituting ground yarn that supports pile yarn 6 is present in symmetric fashion at top and bottom. In addition, by causing the woven pile constituted in such fashion to be cut at the center of pile yarn 6, as shown in FIG. 14, cut pile woven fabric 3e having steps or cut pile woven fabric 3c being present in symmetric fashion at top and bottom in woven pattern 3a, it is possible to cause two thereof to be manufactured from woven pile fabric 3b in a single operation. Here, weaving of woven pile fabric 3b is carried out using pile yarn 6g which is multifilament comprising straight filament 9b at column B pile yarn 6b and pile yarn 6f which is stretchable multifilament comprising crimped filament 9a at column A pile yarn 6a in which pile yarn 6 is under prescribed yarn tension at this woven pattern 3a with symmetric top and bottom, cutting of pile yarn 6 at the woven fabric 3 that is formed making it possible without carrying out grooming of cut pile woven fabric 3c to form cut pile woven fabric 3e with stripes having steps due to the difference in stretchability of pile yarn 6. Weaving in accordance with the method in which pile is made using a double-woven pattern 3a in which both the warp and the weft are double-woven is such that formation at top and bottom occurs in symmetric fashion, there being engagement of weft yarns 5b present at top and bottom in FIG. 13. That is, pile supporting yarn 5 comprising warp yarn 5a and weft yarn 5b constituting ground yarn is present at top and bottom, this being a woven pile fabric 3b in which, as shown in FIG. 13, supporting yarn layers 5c which support pile yarn 6 are present at top and bottom in double-woven pattern 3a. At this double-woven pattern 3a, weaving conditions are such as to cause tension to be applied to pile yarn 6 between the top and bottom. Furthermore, filament 9 employed at pile yarn 6 is multifilament 9c constituting a multiplicity of filaments which are crimped filaments 9a made of synthetic fiber having stretchability made of synthetic fiber, and pile yarn 6g that is straight filament 9b and that comprises straight filament which is multifilament 9c which comprises a multiplicity of soft-twist filaments, being pile yarn 6 of lower stretchability than pile yarn 6f which is crimped multifilament. Such pile yarn 6 comprising multifilament 9c is subjected to prescribed tension and is woven into woven pile fabric 3b. For this reason, this is woven pile fabric 3b that exhibits a condition such that tension causes occurrence of elongation at pile yarn 6f which is crimped filament comprising multifilament 9c which is crimped filament 9a which is crimped, and this is woven pile fabric 3b that exhibits a condition such that there is no pronounced occurrence of elongation despite application of tension at pile yarn 6g which is straight filament comprising soft-twist multifilament 9c comprising straight filaments 9b.

It so happens that to obtain cut pile woven fabric 3e having steps, woven pile fabric 3b which is woven with application of tension, at pile yarn 6 present between upper and lower supporting yarn layers 5c and double-woven pattern 3a having upper and lower supporting yarn layers 5c comprising warp yarn 5a weft yarn 5b constituting pile supporting yarn 5, is such that pile yarn 6f which is crimped filament comprising multifilament 9c which is crimped filament 9a at column A and pile yarn 6g comprising multifilament 9c which is straight filament 9b at column B are respectively made to assume a state in which they are subjected to tension and are, as a result of cutting with a blade at a location intermediate at pile yarn 6 which is present between upper and lower supporting yarn layers 5c, divided into two portions as shown in FIG. 13, these being an upper portion and a lower portion.

As a result of the foregoing cutting, double-woven pattern 3a having supporting yarn layers 5c comprising warp yarn 5a weft yarn 5b constituting pile supporting yarn 5 are separated into an upper and lower thereof, and the tension that had been applied to pile yarn 6 is released. Upon so doing, as shown in FIG. 14, crimped cut pile 4d at column A comprising multifilament 9c comprising crimped filament 9a is made to assume a crimped state, becoming shorter than the original length that it had prior to cutting. In contradistinction thereto, because cut pile 4e which is multifilament 9c and which is straight filament 9b at column B, being straight filament 9b and being soft-twist filament, is almost completely uncrimped, cut pile 4e does not assume a shortened state. As a result, at the tips of the cut multifilament 9c, steps 3f comprising stripes are formed between the tips of crimped cut pile 4d at column A and the tips of straight cut pile 4e at column B. In this way, it is possible by means of weaving conditions and pile yarn characteristics to form cut pile woven fabric 3e with stripes having steps. In addition, it is possible by including crimped fiber (filament) to form a region (crimped fiber location) at which gaps(s) are small and to without carrying out grooming through use of grooming means improve seal characteristics with respect to powder. Furthermore, by causing cut pile yarn 6c which forms steps 3f comprising stripes which include such crimped fibers to be groomed by grooming means in one direction which is the direction of the stripes, it is also possible produce a sealing member 2 having directionality such that the direction in which toner 8a which is powder 8 is made to flow out is controlled. With regard to the stripes having a grooming direction in one direction which is one aspect of the present invention, by causing the direction of the stripes at sealing member 2 having steps 3f to form powder control angle α with the long side of rectangular sealing material 1 as can be seen at FIG. 10, it is possible to produce a sealing material 1 that may be used to prevent leakage of dust, toner 8a which is fine powder 8, and so forth. Furthermore, where this is used as sealing member 2 for a rotating body, it is more preferred that cut cut pile yarn 6c be groomed; but where this is used at a nonrotating straight body, because it is used in a compressed state, it may be used without having been groomed.

The invention under application is primarily a sealing material 1 that prevents leakage of fine powder 8 which is used in contact with rotating body 7a. It so happens, as has been described above, that by utilizing differences in characteristics of filament 9 at woven pile fabric 3b, cut pile woven fabric 3e having steps with stripes comprising cut pile yarn 6c which is cut pile woven fabric 3c comprising woven pattern 3a is made to serve as sealing member 2. For example, as shown in FIG. 8, steps 3f having stripes are provided which are attributable to projecting bands 3g comprising cut pile yarn 6c, and to recessed bands 3h which are portions at which there is only woven pattern 3a which are portions at which cut pile yarn 6c is not present. As shown in FIG. 7, sealing member 2 having such steps 3f is groomed by grooming means, pile yarn 6 being constituted from alternation of two columns of each of two types thereof, these being groomed column A cut pile yarn 6d of high height and groomed column B cut pile yarn 6e of low height. As shown in FIG. 15, weaving conditions and pile yarn characteristics are such as to cause steps 3f which are the difference in height between the tips of the mutually adjacent two columns of column A cut pile yarn 6d comprising crimped filament 9a and the tips of the mutually adjacent two columns of column B cut pile yarn 6e comprising straight filament 9b to be constituted from repetition of column A with crimped cut pile 4d and column B with straight cut pile 4e. In addition, cut pile woven fabric 3e having steps constituted in such fashion may be used as sealing material 1 or sealing member 2.

This sealing material 1 is used as shown in FIG. 16 by causing step 7e comprising projection 7c and recess 7d formed at the bottom face of member 7 being sealed to be contacted by step 3f between the two columns of column B cut pile 4e comprising straight filament 9b and the two columns of column A cut pile 4d comprising crimped filament 9a of pile yarn 6 at seal 1 therebelow to prevent leakage of fine powder 8, i.e., toner 8a, from the contacting portion as shown in FIG. 17. Note that seal 1 having cut pile yarn 6c having steps 3f comprising stripes may be obtained by using stretchable pile yarn 6 comprising multifilament 9c which are filaments 9 of various different stretchabilities, or pile yarn 6 comprising suitable combination of multifilaments such as multifilament(s) 9c including crimped filament(s) a and/or pile yarn 6f comprising multifilament 9c which are crimped filaments 9a and/or pile yarn 6g comprising multifilament 9c which are straight filaments 9b, as pile yarn 6 comprising multifilament 9c in such fashion. Moreover, using pile yarn 6f which is multifilament 9c comprising crimped filaments 9a, using woven pile fabric 3b comprising upper/lower double-woven pattern 3a shown in FIG. 13, the pile yarn 6 thereof, i.e., the two columns of column A pile yarn 6f and the two columns of column B pile yarn 6g adjacent thereto make it possible, following cutting at an intermediate location between top and bottom at pile yarn 6 which is present in alternating fashion, to reduce gap(s) between filaments due to crimping of crimped filaments 9a, this making it possible to improve the seal characteristics of member 7 being sealed both when this is stationary and when this is in operation as shown in FIG. 17. Furthermore, whereas cut pile woven fabric 3c has been described in terms of a woven fabric having a double-woven pattern in which both the warp and the weft are double-woven, there is no limitation with respect to such woven fabric.

Hereinbelow, specific examples of the invention under application are described with reference to items listed in TABLE 1 and TABLE 2 which are working examples. At the outset, at a first working example, as has already been indicated with reference to FIG. 12, the constitution is such as to prevent leakage of toner 8a to the exterior from end seal material 1b which contacts the end of develop roller 12a which is rotating body 7a installed at powder carrier chamber 8b within which toner 8a is stored. This end seal material 1b is formed from sealing member 2 comprising cut pile woven fabric 3e having steps. Moreover, at this cut pile woven fabric 3e having steps, cut pile yarn 6c comprising filament(s) 9 that form cut pile 4 is entangled with and captured by weft yarn 5b of underlayer 3d comprising plain weave comprising warp yarn 5a and weft yarn 5b of pile supporting yarn 5 which is ground yarn, being formed continuously in columnar fashion in one direction. At this rotating body 7a which is develop roller 12a, e.g., as can be seen at the side view of develop apparatus 12 of electrophotographic image forming apparatus 11 at (a) in FIG. 12, toner 8a at toner storage chamber 12c might be agitated by agitator 12d and supplied by supply roller 12b to the periphery of develop roller 12a of develop toner chamber 12b. Accordingly, this toner 8a at develop apparatus 12 is housed within powder carrier 8b at the periphery of develop roller 12a which is rotating body 7.

It so happens that cut pile 4 of this cut pile woven fabric 3e having steps is cut to pile length 4d which is a given length. Cut pile yarn 6c which forms this cut pile 4 of cut pile woven fabric 3e having steps is such that cut pile 4 is made to be inclined at grooming angle θ in more or less one direction by grooming means, with pile supporting yarn 5 which supports cut pile 4 serving as pivot. In this context, as shown at FIG. 4 and FIG. 5, taking the diameter of cut pile yarn 6c to be $\Phi_p$, taking the diameter of pile supporting yarn 5 which supports cut pile yarn 6c to be $\Phi_s$, and taking the average particle diameter of powder 8 which is toner 8a to be $\Phi_t$, radius r at the base of cut pile yarn 6c is . . .

$r=\Phi_p+(\Phi_s/2)+\Phi_t, \ldots$ taking the pitch between supporting yarns at pile supporting yarn 5 which supports cut pile yarn 6c to be L, it will be the case that . . .

$r/(L/2)=\sin \Phi.$

Note that this θ is the grooming angle of pile 4, it being necessary to prevent breakage of powder 8 that the angle be made to correspond to grooming which is carried out to an extent greater than this grooming angle θ, it being the case that formation thereof may be achieved at cut pile woven fabric 3e having steps or the condition(s) may be satisfied through attachment to the apparatus and compression thereof.

Moreover, the constitution is such that the grooming angle of the cut pile is the same as the preceding grooming angle θ at cut pile 4 or is smaller than than grooming angle θ thereat, and such that cut pile length 4c is greater than pitch L between supporting yarns comprising pile supporting yarn 5 which supports cut pile yarn 6c. Moreover, this cut pile yarn 6c is in the form of sealing material 1 for prevention of leakage of powder 8 which has laminating member 10 which is foamed body 10a having reactive-force-providing male at the back surface thereof or sealing member 2 comprising cut pile woven fabric 3e having steps which are stripes and comprising a plurality of cut pile yarns 6c. As described above, sealing material 1 in accordance with the first specific example of the present invention is sealing material 1 which comprises cut pile woven fabric 3e, which has steps, and which has cut pile 4.

Next, a second specific example of the invention under application will be described. At this second specific example, sealing member 2 making up sealing material 1 is associated with the constitution of sealing member 2 comprising woven pile fabric 3b. At this sealing member 2, respective pile yarns of two or more types having different characteristics are arranged in columnar bands, woven pattern 3a in striped weave forming stripes being formed in a unidirectional continuous columnar pattern in spaced fashion with a support spacing comprising a given pitch L between pile supporting yarns 5 that support pile yarn 6. Moreover, woven pile fabric 3b formed with the unidirectional continuous columnar weave pattern is such that pile is cut at a given length which is greater than the spacing of pitch L at yarn 5 that supports pile yarn 6, the front surface of cut pile woven fabric 3c which is produced as a result of cutting is formed in striped fashion.

Moreover, as shown in FIG. 4 and FIG. 5, this cut pile woven fabric 3c having cut pile 4 comprising cut pile woven fabric 3c having stripes is such that cut pile 4 has been made to be inclined in more or less one direction by grooming means, with pile supporting yarn 5 which supports cut pile yarn 6c serving as pivot, being cut pile woven fabric 3e that has the inclined stripes and steps of cut pile 4. Moreover, sealing member 2 is formed from this cut pile woven fabric 3e having stripes. Using this sealing member 2 having cut pile 4, or using sealing member 2 formed by laminating this cut pile woven fabric 3e with foamed body 10a having reactive-force-providing elasticity constituting laminating member 10, by causing this to be a given shape, this is made into sealing material 1 for preventing leakage of powder 8. That is, this sealing material 1 in accordance with the second specific example is sealing material 1 employing cut pile woven fabric 3e in accordance with the first specific example.

Moreover, a third specific example of the invention under application will be described. At this third specific example, sealing member 2 making up sealing material 1 is associated with the constitution of sealing member 2 comprising cut pile woven fabric 3e. At this sealing member 2, cut pile woven fabric 3e is such that a plurality of pile yarns 6 are formed in unidirectional continuous columnar fashion, these pile yarns 6 that are formed in columnar fashion causing formation thereof into woven pile fabric 3b comprising stripes, this woven pile fabric 3b comprising woven pattern 3a which forms stripes being such that pile 4 is cut to a given cut pile length 4c to form cut pile 4. Accordingly, this woven fabric is cut pile woven fabric 3c having stripes having cut pile 4.

This cut pile woven fabric 3c comprising stripes having cut pile 4 is sealing material 1 employing cut pile woven fabric 3e with stripes in accordance with the first specific example which is sealing material 1 for preventing leakage of powder 8 which is such that cut pile 4 is cut pile woven fabric 3e constituted such that the grooming angle in a region formed by at least one of those cut pile yarns 6c which is groomed in more or less one direction by grooming means is less than grooming angle θ, with pile supporting yarn 5 which supports cut pile yarn 6c serving as pivot, being a sealing member 2 comprising cut pile woven fabric 3e with stripes formed by steps 3f which is such that the front surface of cut pile woven fabric 3e has formation of steps 3f which are produced by stripes and which are in a direction perpendicular to the direction of the stripes or has a difference in elasticity due to cut pile yarn 6c at the front surface of cut pile woven fabric 3e comprising stripes, and this sealing member 2 which is cut pile woven fabric 3e having stripes and having steps 3f is used to form a given shape or is laminated to a laminating member to form a given shape.

Next, a fourth specific example of the invention under application will be described. At this fourth specific example, sealing member 2 making up sealing material 1 is sealing member 2 comprising cut pile woven fabric 3e at which cut pile woven fabric 3c is groomed and the front surface is such that steps 3f are formed at stripes, this cut pile woven fabric 3c comprising columns of cut pile yarns 6c of different characteristics, e.g., two types of cut pile yarn 6c of different elasticities, the columns of the respective cut pile yarns 6c being woven continuously in one direction in such fashion as to form a given number thereof which are arranged in alternating fashion. This is pile yarn 6 which constitutes cut pile woven fabric 3c comprising stripes due to formation of columns of these respective cut pile yarns 6c and which is cut to a given length, being cut pile woven fabric 3c comprising stripes at cut pile 4 comprising a plurality of cut pile yarns 6c. This cut pile woven fabric 3c comprising stripes is made to be inclined in more or less one direction by grooming means, with pile supporting yarn 5 which supports cut pile yarn 6c serving as pivot, to form cut pile woven fabric 3e. There is a sealing member 2 comprising cut pile woven fabric 3e which is such that the front surface of cut pile woven fabric 3e has formation of steps 3f which are produced by stripes and which are in a direction perpendicular to the direction of the stripes due to cut pile yarns of different characteristics, e.g., two types of cut pile yarn 6c of different pile yarn diameter, or formation of steps 3f comprising projections and recesses as a result of formation of stripes comprising a plurality of strands of cut pile at which the pile yarns are of different stretchabilities, or formation of steps 3f comprising projections and recesses at stripes at the front surface due to a plurality of cut pile yarns of different materials, or in which difference in elasticities of a plurality of cut pile yarns 6c comprising stripes causes the front surface of cut pile woven fabric 3e to be such that steps 3f are formed at stripes and such that the front surface has a difference in elasticities and comprises steps 3f. There is a sealing material 1 employing cut pile woven fabric 3e comprising stripes in which this sealing member 2 which is cut pile woven fabric 3e comprising stripes is used to form a given shape or is laminated to laminating member 10 to form a given shape to produce sealing material 1 for preventing leakage of powder 8.

Moreover, this is a sealing member 2 which is such that cut pile yarn 6c at cut pile woven fabric 3c used in the foregoing sealing material 1 is multifilament 9c comprising a plurality of filaments 9, this cut pile yarn 6c comprising multifilament 9c is made by grooming means to be inclined in more or less one direction which is a direction perpendicular to pile supporting yarn 5 by which it is supported, the front surface of cut pile woven fabric 3c comprises cut pile woven fabric 3e in which steps 3f are formed at cut pile woven fabric 3c with stripes formed by arrangement in columnar fashion of cut pile yarn 6c which is multifilament 9c comprising filaments 9 of different characteristics, e.g., different elasticities, or cut pile woven fabric 3e having steps at stripes formed as a result of grooming of filaments 9 by grooming means, in which filaments 9 used in respective cut pile yarns 6c having stripes are made to be of respectively different characteristics, and in which filaments 9 making up cut pile yarn 6c are selected so as to cause there to be respectively different elasticities at the columnar front surface of cut pile woven fabric 3c comprising stripes. There is a sealing material 1 employing cut pile woven fabric 3e having steps and having stripes in accordance with the second, third, or fourth specific example in which this sealing member 2 which is cut pile woven fabric 3e comprising stripes is used to form a given shape or is laminated to laminating member 10 to form a given shape to produce sealing material 1 for preventing leakage of powder 8.

A fifth specific example of the invention under application will be described. At this fifth specific example, the foregoing cut pile yarn 6c is made to be inclined or is groomed, means which provides steps 3f in a direction perpendicular to the direction comprising stripes forming a pattern comprising stripes, and at least one means among means providing gaps between strands of cut pile yarn 6c, means in the context of cut pile woven fabric 3e employing a plurality of cut pile yarns 6c which uses cut pile yarns 6c of different yarn diameters for the cut pile yarns 6c used thereat, means employing cut pile yarns 6c for which the number of twists used when yarn is twisted to constitute cut pile yarn 6c is different, means employing cut pile yarns 6c for which the filaments 9 used at the cut pile yarns 6c are of different material, means employing cut pile yarns 6c for which the filaments 9 used to constitute cut pile yarns 6c are of different diameter, and means employing cut pile yarns 6c for which the filaments 9 used to constitute cut pile yarns 6c are of different cross-sectional shape, is used, being a sealing member 2 comprising cut pile woven fabric 3e which is such that the front surface of cut pile woven fabric 3e has formation of steps 3f due to cut pile yarn 6c or has steps at cut pile yarn 6c such that the columnar front surface comprising stripes has respectively different elasticities. There is a sealing material 1 employing cut pile woven fabric 3e having steps comprising stripes in accordance with the fifth specific example which is such that this sealing member 2 comprising cut pile woven fabric 3e having steps comprising stripes is used to form a given shape or is laminated to laminating member 10 to form a given shape to produce sealing material 1 for preventing leakage of toner 8a.

A sixth specific example of the invention under application will be described. At this sixth specific example, the foregoing cut pile woven fabric 3e is made to be inclined or is groomed, and has steps 3f comprising stripes, and has, as means for preventing loss of fiber from cut pile 4 at cut pile woven fabric 3e, means for preventing loss of fiber making use of thermal fusing in which ground yarn which is pile supporting yarn 5 is made to include thermally fused filament(s), and this pile supporting yarn 5 is groomed, means for preventing loss of fiber making use of coating agent applied to the back surface of cut pile woven fabric 3c after cut pile 4 has been made to be inclined or has been groomed, and/or means for preventing loss of fiber making use of adhesive or hot-melt adhesive at the back surface of cut pile woven fabric 3e, being a sealing member 2 which is such that loss of cut pile 4 is prevented through use of at least one of these means for preventing loss of fiber. There is a sealing material 1 employing cut pile woven fabric 3e comprising stripes in accordance with the sixth specific example which is such that cut pile woven fabric 3e at which such prevention of loss of fiber has been carried out and cut pile yarn 6c has been made to be inclined and which has stripes is used to form a given shape or is laminated to laminating member 10 to form a given shape to produce sealing material 1 for preventing leakage of toner 8a.

A seventh specific example of the invention under application will be described. At this seventh specific example, the foregoing sealing material 1 is made to contact the end of rotating body 7a which is present at the interior of powder carrier chamber 8b, cut pile woven fabric 3e having stripes being cut or punched to produce sealing material 1, this sealing material 1 being made to contact the end of rotating body 7a in such fashion as to cause powder control angle α which is the orientation of longitudinal stripes at sealing member 2 having stripes, or powder control angle α of cut pile 4 at the front surface of sealing material 1, relative to the direction of rotation of rotating body 7a to be made to be a powder control angle α such as will return powder 8 which is toner 8a by causing it to be directed in a direction opposite the direction in which powder 8 which is toner 8a leaks out to impinge thereon, so that this powder 8 does not leak out to the exterior of powder carrier chamber 8b, being a sealing material 1 that prevents leakage out to the exterior by way of steps 3f of projecting and recessed shape comprising stripes from powder carrier chamber 8b of powder 8 which is toner 8a from the end of rotating body 7a, the seventh specific example being a sealing material 1 that employs cut pile woven fabric 3e comprising stripes in accordance with any one specific example among the first through sixth specific examples.

An eighth specific example of the invention under application will be described. At this eighth specific example, the foregoing sealing material 1 is such that the front surface is sealing material 1 comprising cut pile woven fabric 3e at which cut pile 4 has been groomed or cut pile woven fabric 3e comprising stripes that have been made to be inclined, i.e., groomed, having steps 3f, and such that laminating member 10 applied to the back surface thereof is a member chosen from among metal elastic material, plastically deformable material, thermoplastic resin, elastomer, and foamed body 10a having reactive-force-providing elasticity, being sealing material 1 which is such that application of a given load to such member prevents leakage of toner 8a which powder 8, being sealing material 1 employing cut pile woven fabric 3e comprising stripes in accordance with the eighth specific example.

A ninth specific example of the invention under application will be described. At this ninth specific example, cut pile woven fabric 3e having steps comprising stripes having steps 3f comprising the foregoing cut pile woven fabric 3e is made to form a given shape to produce sealing member 2, or laminating member 10 is further laminated to said sealing member 2 to form a given shape to produce sealing member 2, such sealing member 2 of given shape being sealing material 1 of such shape as to comprise a given size for which the direction of stripes have a given orientation, such sealing material 1 being made to contact rotating body 7 and end seal material 1b for a powder carrier at electrophotographic image forming apparatus 11, being sealing material 1 that prevents leakage of powder 8, and being sealing material 1 that employs cut pile woven fabric 3e having steps comprising stripes in accordance with the ninth specific example.

A tenth specific example of the invention under application will be described. At this tenth specific example, a film is formed on the front surface of the foregoing sealing member 2 comprising cut pile woven fabric 3e having stripes by rubbing thereon a substance such as an ester wax which is wax or paraffin or bar soap, metallic soap, or other such fatty acid salt comprising solid matter, such sealing member 2 of given shape being sealing material 1 of such shape as to comprise a given size for which the direction of stripes have a given orientation, such sealing material 1 being made to contact rotating body 7 and end seal material 1b for a powder carrier at electrophotographic image forming apparatus 11, being sealing material 1 that prevents leakage of powder 8, and being sealing material 1 that employs cut pile woven fabric 3e comprising stripes in accordance with the tenth specific example.

Working Examples

In accordance with the constitution and design values indicated at TABLE 1, using two types of pile yarn 6 comprising column A pile yarn 6a and column B pile yarn 6b, a Jacquard loom was employed to fabricate woven pile fabric 3b for formation of sealing member 2 at Working Examples 1 through 7, this was cut at the approximate center of the pile yarn, and a shearing machine was used to carrying out cutting so as to achieve prescribed uniform cut pile length 4c to manufacture prescribed cut pile woven fabric 3c. Next, a brush roller serving as grooming means was used to adequately groom this cut pile woven fabric 3c in one direction to produce cut pile woven fabric 3e. Note that these woven pile fabrics 3b were fabricated using column A pile yarn 6a and column B pile yarn 6b of differing materials, pile yarn 6 being filaments 9 of two types of different diameters and numbers thereof which were column A pile yarn 6a and column B pile yarn 6b that were constitutions of striped woven fabric. As shown in FIG. 1, at underlayer 3d which was in plain weave comprising warp yarn 5a and weft yarn 5b which was ground yarn comprising pile supporting yarn 5, causing two columns of column A pile yarn 6a and two columns of column B pile yarn 6b to be arrayed in alternating fashion resulted in formation of cut pile woven fabric 3c having stripes, grooming by grooming means resulting in formation of cut pile woven fabric 3e having steps. At TABLE 1, Working Examples 1 through 7 are presented, constitution and design values being listed for sealing members 2 comprising cut pile woven fabrics 3e, the vertical columns indicating column A pile yarn 6a and column B pile yarn 6b, and the horizontal rows indicating characteristics of sealing member 2, characteristics of pile 4, characteristics of pile yarn 6, characteristics of weft yarn 5b at pile supporting yarn 5, characteristics of grooming angle at cut pile 4, characteristics of step 3f comprising column A cut pile yarn 6d and column B cut pile yarn 6e, and so forth. (At Working Examples 1 through 7 in this TABLE 1, upon comparing the magnitude of pile diameter 4b and the number of filaments (F) per decitex T of column A pile yarn 6a to the magnitude of pile diameter 4b and the number of filaments (F) per decitex T of column B pile yarn 6b, it will be noted that the diameter of filaments 9 is smaller and the number of filaments 9 is greater at column A pile yarn 6a than at column B pile yarn 6b.)

TABLE 1

|  |  | Working Example 1 | | Working Example 2 | | Working Example 3 | | Working Example 4 | |
| --- | --- | --- | --- | --- | --- | --- | --- | --- | --- |
|  |  | Column A pile yarn | Column B pile yarn | Column A pile yarn | Column B pile yarn | Column A pile yarn | Column B pile yarn | Column A pile yarn | Column B pile yarn |
| Constitution and design values of woven pile fabric sealing member | Pre-grooming sealing member thickness (mm) | 3.2 | 3.2 | 1.7 | 1.7 | 3.5 | 3.5 | 1.7 | 1.7 |
|  | Pile length (mm) | 2.97 | 2.97 | 1.55 | 1.55 | 3.35 | 3.35 | 1.55 | 1.55 |
|  | Pile diameter (mm) (diameter at maximum density; calculated value) | 0.103 | 0.183 | 0.103 | 0.095 | 0.103 | 0.095 | 0.103 | 0.095 |
|  | Pile yarn constitution Filaments (F)/decitex (T) | 140F/84T | 60F/440T | 140F/84T | 30F/84T | 140F/84T | 30F/84T | 140F/84T | 30F/84T |
|  | Number of columns of pile yarn | 2 | 2 | 4 | 4 | 2 | 2 | 2 | 2 |
|  | Diameter of weft yarn (mm) | 0.09 | 0.09 | 0.09 | 0.09 | 0.09 | 0.09 | 0.09 | 0.09 |
|  | Post-grooming thickness (mm) | 1.372 | 1.99 | 0.744 | 0.713 | 1.436 | 1.369 | 0.745 | 0.713 |
|  | Grooming angle (°) | 22.6 | 36.4 | 22.6 | 21.4 | 22.6 | 21.4 | 22.6 | 21.4 |
|  | Step (mm) (height of column A − height of column B) | −0.618 | | 0.031 | | 0.067 | | 0.032 | |
|  | Pile filament density (filaments/inch$^2$) | 317,000 | | 706,000 | | 353,000 | | 353,000 | |

|  |  | Working Example 5 | | Working Example 6 | | Working Example 7 | |
| --- | --- | --- | --- | --- | --- | --- | --- |
|  |  | Column A pile yarn | Column B pile yarn | Column A pile yarn | Column B pile yarn | Column A pile yarn | Column B pile yarn |
| Constitution and design values of woven pile fabric sealing member | Pre-grooming sealing member thickness (mm) | 3.5 | 3.5 | 1.7 | 1.7 | 1.7 | 1.7 |
|  | Pile length (mm) | 3.35 | 3.35 | 1.55 | 1.55 | 1.55 | 1.55 |
|  | Pile diameter (mm) (diameter at maximum density; calculated value) | 0.103 | 0.095 | 0.103 | 0.095 | 0.103 | 0.095 |
|  | Pile yarn constitution Filaments (F)/decitex (T) | 140F/84T | 30F/84T | 140F/84T | 30F/84T | 140F/84T | 30F/84T |
|  | Number of columns of pile yarn | 2 | 2 | 2 | 2 | 1 | 1 |
|  | Diameter of weft yarn (mm) | 0.09 | 0.09 | 0.09 | 0.09 | 0.09 | 0.09 |
|  | Post-grooming thickness (mm) | 1.436 | 1.369 | 0.745 | 0.713 | 0.745 | 0.713 |
|  | Grooming angle (°) | 22.6 | 21.4 | 22.6 | 21.4 | 22.6 | 21.4 |
|  | Step (mm) (height of column A − height of column B) | 0.067 | | 0.032 | | 0.032 | |
|  | Pile filament density (filaments/inch$^2$) | 235,000 | | 235,000 | | 102,000 | |

The sealing member 2 comprising cut pile woven fabric 3c that was fabricated was such that cut pile 4 was subjected to shearing, i.e., cutting of fiber, so as to achieve a given thickness which was the pre-grooming sealing member 2 thickness indicated at TABLE 1, to obtain column A cut pile yarn 6d and column B cut pile yarn 6e comprising two types of cut pile yarn 6c, i.e., different pile diameters $\Phi_p$, comprising a multiplicity of filaments 9 as indicated at TABLE 2. At such time, these two types of cut pile yarn 6c, i.e., column A cut pile yarn 6d and column B cut pile yarn 6e, were such that the fibers thereof stood in more or less upright fashion. Thus, in a situation in which notwithstanding the fact that two types of cut pile yarn 6c of different pile diameter $\Phi_p$ were used, it was not the case that one of these two types of cut pile yarns 6c was crimped filament 9a, it being the case that the two types were both straight filament 9b, the thicknesses of these two types were uniformly and evenly the same. Note that it is preferred that soft-twist filament 9 be employed at pile yarn 6 so that spreading of fibers during shearing is satisfactory.

Subsequent to the foregoing cutting of fiber at shearing, cut pile yarn 6c was groomed by grooming means as shown in FIG. 3. At this grooming means, a brush roller, not shown, was made to rotate in one direction over cut pile woven fabric 3c, and cut pile 4 of cut pile woven fabric 3c was groomed in one direction. At this FIG. 2, note that, in accordance with the invention under application, two types of cut pile yarn 6c of different pile diameter $\Phi_p$ were used to constitute cut pile woven fabric 3c having stripes, while at FIG. 3, in accordance with the invention under application, cut pile 4 was groomed by grooming means, this being groomed in one direction with weft yarn 5b which is supporting yarn 5 for cut pile yarn 6c of cut pile woven fabric 3e serving as pivot as shown in the front view at (b) in FIG. 3, forming steps 3f comprising the difference between groomed fiber height $H_1$ at column A cut pile yarn 6d and groomed fiber height $H_2$ at column B cut pile yarn 6e. In this way, the invention under application, by using cut pile yarn 6c of a plurality of different pile diameters $\Phi_p$, forms cut pile woven fabric 3c comprising stripes; and in addition, by grooming cut pile yarn 6c in such fashion that pile supporting yarn 5 serves as pivot, forms steps 3f in a direction perpendicular to the direction of stripes, i.e., steps 3f of projecting and recessed shape comprising stripes, at the front surface of cut pile woven fabric 3e of the present invention. In this way, the invention under application, through use of cut pile yarn 6c of a plurality of different pile diameters $\Phi_p$, permits formation of cut pile woven fabric 3c having stripes, and by grooming cut pile yarn 6c in such fashion that pile supporting yarn 5 serves as pivot, permits formation of steps 3f comprising stripes at the front surface of cut pile woven fabric 3e.

Next, as means for preventing loss of fiber from underlayer 3d at cut pile woven fabric 3c or cut pile woven fabric 3e, cut pile yarn 6c was such that weft yarn 5b at pile supporting yarn 5 which was the ground yarn for cut pile yarn 6c was in advance made to contain thermally fusible yarn, and the thermally fusible yarn contained in this weft yarn 5b was made to melt so as to cause weft yarn 5b of pile supporting yarn 5 which was underlayer 3d of cut pile woven fabric 3e in plain weave and cut pile yarn 6c to be made to fuse as a result of thermal fusing to produce sealing member 2. The difference between the thickness which is the height following grooming of column A cut pile yarn 6c and the thickness which is the height following grooming of column B cut pile yarn 6e is step 3f. These are respectively indicated, e.g., as post-grooming thickness (mm), step (mm) (height of column A−height of column B), etc., in the horizontal rows where the constitution and design values of woven pile fabric sealing members are listed in TABLE 1.

Next, samples of the sealing members 2 that were fabricated were measured, the values measured for the sealing members 2 being shown in TABLE 2. The sealing members 2 comprising cut pile woven fabric 3e that were samples are presented at TABLE 2, the portion at column A cut pile yarn 6d and the portion at column B cut pile yarn 6e for the respective Working Example 1 through Working Example 7 being indicated in the vertical columns as the column A cut pile yarn location and the column B cut pile yarn location, with thickness (mm), grooming angle (°), and step (mm) (height of column A−height of column B) being indicated in the horizontal rows. At this TABLE 2, note that the difference between the thickness which is the height of the portion at column A cut pile yarn 6d and the thickness which is the height of the portion at column B cut pile yarn 6e is step 3f, this step 3f being listed at TABLE 2 as step (mm) (height of column A−height of column B).

As a result of using cut pile 4 of two types of different materials and yarn diameter, the grooming angle of the cut pile 4, as indicated at TABLE 2, approximated, or the grooming angle was not greater than, the design values at TABLE 1. Moreover, use of two different types of cut pile 4 made it possible to form steps 3f by means of cut pile 4, and made it possible to obtain sealing members 2 comprising cut pile woven fabric 3e having steps at stripes.

Next, Working Example 1 through Working Example 7 of sealing member 2 in accordance with the invention under application that were obtained above and Comparative Example 1 through Comparative Example 2 which were sealing members comprising conventional woven pile fabric were compared, density (filaments/inch$^2$) of filaments 9 at pile yarn 6, and the respective amount of vibration withstood (acceleration (m/s$^2$); 50 Hz) at the base versus at the tip of cut pile yarn 6c when a reactive-force-providing load of 100 g per 1 cm$^2$ was applied to cut pile woven fabric 3e, being indicated at TABLE 3, below. Moreover, TABLE 3 indicates the minimum reactive-force-providing load (g/s$^2$) for which leakage did not occur when acceleration was 50 m/s$^2$, and the results of evaluation (O=satisfactory) of seal characteristics in an actual apparatus (surface speed=560 mm/s). As indicated at TABLE 3, as compared with conventional sealing members, sealing members in accordance with the present invention exhibit satisfactory improvement in seal characteristics at the base, and permit prevention of leakage of powder at low load. Furthermore, there was ability to prevent leakage of powder from the base and from the surface at low load such as had not been seen conventionally even over a broad range that extended from the situation where pile density (filament density) was low to the situation where this was high. As described above, it is a sealing material that makes it possible to achieve seal characteristics at low load and permits reduction in heat due to friction in combination with reduction in contact area as a result of provision of steps, and it is a sealing material that makes it possible to achieve seal characteristics at high speed. Moreover, because it makes it possible to achieve seal characteristics at low density, it may also be employed as a sealing material that is conservative of resources.

TABLE 2

| | | Working Example 1 | | Working Example 2 | | Working Example 3 | | Working Example 4 | |
|---|---|---|---|---|---|---|---|---|---|
| | | Column A cut pile yarn | Column B cut pile yarn | Column A cut pile yarn | Column B cut pile yarn | Column A cut pile yarn | Column B cut pile yarn | Column A cut pile yarn | Column B cut pile yarn |
| Measured values of sealing member | Thickness (mm) | 1.21 | 1.48 | 0.92 | 0.82 | 1.47 | 1.34 | 1.02 | 0.64 |
| | Grooming angle (°) | 17.5 | 22.9 | 23.9 | 19.9 | 19.7 | 18.2 | 25.5 | 13 |
| | Step (mm) (height of column A − height of column B) | −0.27 | | 0.19 | | 0.13 | | 0.38 | |
| | | Working Example 5 | | Working Example 6 | | Working Example 7 | | | |
| | | Column A cut pile yarn | Column B cut pile yarn | Column A cut pile yarn | Column B cut pile yarn | Column A cut pile yarn | Column B cut pile yarn | | |
| Measured values of sealing member | Thickness (mm) | 0.96 | 0.73 | 0.651 | 0.603 | 0.64 | 0.55 | | |
| | Grooming angle (°) | 11.5 | 7.5 | 13.4 | 11.6 | 13 | 9.6 | | |
| | Step (mm) (height of column A − height of column B) | 0.23 | | 0.05 | | 0.09 | | | |

TABLE 3

|  |  | Present Invention | | | | | | | Conventional | |
|---|---|---|---|---|---|---|---|---|---|---|
|  |  | Working Example 1 | Working Example 2 | Working Example 3 | Working Example 4 | Working Example 5 | Working Example 6 | Working Example 7 | Comparative Example 1 | Comparative Example 2 |
| Pile filament density (filaments/inch$^2$) | | 317,000 | 706,000 | 353,000 | 353,000 | 235,000 | 235,000 | 102,000 | 450,000 | 650,000 |
| Vibrations withstood when reactive-force-providing load = 100 g/cm$^2$ | Fiber tips | 100 or higher | 100 or higher | 100 or higher | 100 or higher | 100 or higher | 100 or higher | 100 or higher | 100 or higher | 100 or higher |
| Acceleration (ms$^2$); 50 Hz | Base | 100 or higher | 100 or higher | 100 or higher | 100 or higher | 100 or higher | 100 or higher | 100 or higher | 35 | 40 |
| Minimum reactive-force-providing load necessary to stop leakage from occurring when acceleration was 50 m/sec$^2$ (g/cm$^2$) | | 35 | 15 | 35 | 5 | 35 | 10 | 15 | 450 | 350 |
| Seal characteristics in actual apparatus Surface speed = 250 mm/sec | | ◯ | ◯ | ◯ | ◯ | ◯ | ◯ | ◯ | ◯ | ◯ |

Foamed body 10a was integrated, by means of adhesive layer 10c in the form of double-sided adhesive tape as shown in FIG. 9, to sealing member 2 obtained in this fashion. That is, pile yarn 6 at woven pile fabric 3b woven in woven pattern 3a having stripes was cut to form cut pile woven fabric 3c having cut pile 4, and cut pile 4 was furthermore groomed by grooming means to form cut pile woven fabric 3e with stripes having steps 3f. Moreover, as has been described above, weft yarn 5b which was ground yarn comprising pile supporting yarn 5 was made to contain thermally fusible yarn, melting of this thermally fusible yarn causing cut pile yarn 6c to adhere to weft yarn 5b of pile supporting yarn 5, sealing member 2 at which prevention of loss of fiber at filaments 9 constituting cut pile yarn 6c has been carried out being shown in FIG. 9. Moreover, foamed body 10a which also served as elastic body serving as laminating member 10 was laminated by means of adhesive 10b to back surface 2a of said sealing member 2. The foregoing adhesive 10b may also be hot-melt or other such adhesive 10b or adhesive in the form of double-sided adhesive tape 10c. As elastic bodies that are such laminating members 10, elastomers, rubber materials, sponges which are foamed bodies, and so forth may be cited as examples. Furthermore, instead of such an elastic body, a metal sheet or a resin sheet may be laminated to sealing member 2. The material formed by lamination of this sealing member 2 and laminating member 10 was fashioned as seal 1 which was made to be of given shape and which was oriented at a given angle relative to the orientation of the stripes, this being cut as shown at (a) in FIG. 10 to obtain sealing material 1 which was of given shape and at which the angle of column A cut pile yarn 6d and column B cut pile yarn 6e were made to be powder control angle α, to form sealing material 1 shown at (b) in FIG. 10.

EXPLANATION OF REFERENCE NUMERALS

1 Sealing material
1b End seal material
2 Sealing member
2a Back surface
3 Woven fabric
3a Woven pattern
3b Woven pile fabric (woven fabric having pile)
3c Cut pile woven fabric (following shearing or following cutting of pile)
3d Underlayer (at woven pile fabric comprising plain weave)
3e Cut pile woven fabric (having steps)
3f Step
3g Projecting band
3h Recessed band
4 Cut pile
4a Column A cut pile
4b Column B cut pile
4c Cut pile length (pre-grooming thickness of cut pile woven fabric)
4d Crimped cut pile
4e Straight cut pile
5 Pile supporting yarn (ground yarn which supports pile)
5a Warp yarn (of ground yarn)
5b Weft yarn (of ground yarn)
5c Supporting yarn layer (layer comprising pile supporting yarn)
6 Pile yarn (yarn comprising filament which forms pile)
6a Column A pile yarn
6b Column B pile yarn
6c Cut pile yarn
6d Column A cut pile yarn
6e Column B cut pile yarn
6f Pile yarn comprising crimped filament
6g Pile yarn comprising straight filament
7 Member being sealed
7a Rotating body
7b Straight body
7c Projection
7d Recess
7e Step
8 Powder
8a Toner
8b Powder carrier chamber
9 Filament
9a Crimped filament
9b Straight filament
9c Multifilament
10 Laminating member
10a Foamed body
10b Adhesive
10c Double-sided adhesive tape 11 Electrophotographic image forming apparatus
12 Develop apparatus
12a Develop roller (developer carrier roller)
12b Supply roller
12c Toner storage chamber
12d Agitator (agitation member)
12e Develop apparatus end seal material (side seal)
12f Toner control blade
13 Vibration testing apparatus
13a Vibration source
13b Angle bar
13c Toner box
13d Cover
13e Material (sealing material) to be evaluated
13f Pickup sensor
13g Direction of vibration
α Powder control angle
$\Phi_p$ Diameter of pile yarn
$\Phi_s$ Diameter of pile supporting yarn
$\Phi_t$ Average particle diameter of powder
$\Phi_{6d}$ Average particle diameter of powder
$\Phi_{6e}$ Average particle diameter of powder
$r_0$ Radius at base of pile yarn (diameter of pile yarn+radius of pile supporting yarn)
r Radius at base of cut pile yarn (diameter of cut pile yarn+radius of pile supporting yarn)
L Pitch (pitch between pile supporting yarns that support pile yarn)
$\theta_0$ Grooming angle (theoretical grooming angle of cut pile yarn)
$\theta_{4a}$ Grooming angle (grooming angle of cut pile 4a)
$\theta_{4b}$ Grooming angle (grooming angle of cut pile 4b)
$\theta_{6d}$ Grooming angle (grooming angle of cut pile yarn 6d)
$\theta_{6e}$ Grooming angle (grooming angle of cut pile yarn 6e)
θ Grooming angle (powder control angle of cut pile)
$α_f$ Angle of inclination (angle of inclination of filament)
H Thickness (height) of cut pile woven fabric following grooming
$H_1$ Groomed height of column A cut pile yarn
$H_2$ Groomed height of column B cut pile yarn

The invention claimed is:

1. A sealing material comprising cut pile woven fabric having stripes characterized in that it is a sealing material that prevents leakage of powder from a rotating body or a straight body, woven pile fabric constituting said sealing material being in a woven pattern forming stripes woven from pile yarn comprising a plurality of filaments, pile of the woven pile fabric formed by said woven pattern being cut to a prescribed length, being cut pile woven fabric in which the stripes are formed, the cut pile woven fabric in which said stripes are formed being such that the stripes are formed on a front surface of the woven fabric by the cut pile, and having steps due to difference in thickness of the cut pile, and in that it is a sealing member having a length of the cut pile that is cut to a prescribed length which is a cut pile length that is greater than a spacing of a pitch at a pile supporting yarn that supports the pile.

2. The sealing material comprising cut pile woven fabric having stripes according to claim 1 characterized in that the cut pile woven fabric at which the pile is cut to the prescribed length and at which the stripes are formed is a woven pattern in which two or more types of respective pile yarns of different characteristics form columnar banded stripes, being cut to prescribed length, and the front surface of the cut pile woven fabric is such that the stripes are formed by cut pile comprising the different pile yarns, being the cut pile woven fabric at which the steps are formed due to the difference in thickness of the cut pile, and the length which is the prescribed length of the cut pile is greater than the spacing of the pitch of the yarn that supports the pile yarn.

3. The sealing material comprising the cut pile woven fabric having the stripes according to claim 1 characterized in that the cut pile of the prescribed length is groomed in one identical direction and is made to be inclined by grooming means, with the pile supporting yarn serving as pivot, and the groomed cut pile causes the front surface of the cut pile woven fabric to have the steps comprising the cut pile at the stripes or the steps due to difference in elasticity of the cut pile at the plurality of the cut pile yarns that form the stripes, this cut pile being groomed, and the cut pile woven fabric having the steps at the stripes which are made to be inclined is used to cause the sealing material for prevention of leakage of powder to be formed in a prescribed shape, or the sealing member comprising the cut pile woven fabric having the steps at the stripes that have been made to be inclined at the cut pile and a laminating member are laminated to form the sealing material of the prescribed shape, being the sealing material for prevention of leakage of the powder from the rotating body or the straight body.

4. The sealing material comprising the cut pile woven fabric having the stripes according to claim 1 characterized in that the sealing material for prevention of leakage of the powder from the rotating body or the straight body comprising the sealing member is such that the sealing member for prevention of leakage of the powder from the rotating body or the straight body comprises cutting or punching of the sealing member which is such that, in contacting an end of the powder carrier which is the rotating body or the straight body, an angle of the cut pile at the front surface of the sealing member or an angle of longitudinal stripes comprising the stripes relative to a direction of rotation of the rotating body at the powder carrier or a direction in which contact is made with the straight body, is made to be angle in a direction such as will cause return of the powder by causing the powder to be directed opposite to a direction in which it would leak to the exterior, so that the powder does not leak to the exterior from the end of the powder carrier.

5. The sealing material comprising the cut pile woven fabric having the stripes according to claim 4 characterized in that the sealing member for prevention of leakage of the powder from the rotating body or the straight body comprising the cutting or the punching of the sealing member is sealing member comprising cut pile woven fabric in which cut pile has been groomed or has been made to be inclined in one direction or sealing member comprising cut pile woven fabric having steps comprising stripes that have been groomed or that have been made to be inclined in one direction, a laminating member laminated to the back surface of this sealing member is a member selected from among foamed body, elastomer, thermoplastic resin, plastically deformable material, and metal elastic material, being a sealing member that has been made suitable for prevention of leakage of the powder upon application of prescribed load to this member, being sealing material for prevention of leakage of the powder from the rotating body or the straight body comprising this sealing member.

6. The sealing material comprising the cut pile woven fabric having the stripes according to claim 5 characterized in that the sealing member comprising the cut pile woven fabric having the steps comprising the stripes that have been groomed or that have been made to be inclined in the one direction is a sealing member that is formed in a prescribed shape of a sealing member or that is laminated to the laminating member to form a sealing member of prescribed shape, being sealing material for prevention of leakage of the powder from the rotating body or the straight body or being end seal material for prevention of leakage of the powder from a powder carrier at an electrophotographic image forming apparatus comprising this sealing member.

7. The sealing material comprising the cut pile woven fabric having the stripes according to claim 6 characterized in that the sealing member that is formed in the prescribed shape or that is laminated to the laminating member to form the sealing member of the prescribed shape is sealing member at which an ester wax film which is wax or paraffin or fatty acid salt comprising solid matter which is metallic soap or bar soap has been rubbingly applied to the front surface of the sealing member, being sealing material for prevention of leakage of the powder from the rotating body or the straight body comprising this sealing member.

8. A sealing material comprising cut pile woven fabric having stripes characterized in that it is a sealing material that prevents leakage of powder from a rotating body or a straight body, wherein a sealing member that makes up the sealing material is a sealing member comprising the cut pile woven fabric, this sealing member is a plurality of pile yarns of different pile yarn characteristics, these respective pile yarns of different characteristics comprise a prescribed number of columns of alternating arrangement, being cut pile woven fabric having the stripes comprising cut pile of prescribed length comprising the stripes which are continuous in one direction, being a sealing member comprising cut pile woven fabric which is such that cut pile of the cut pile woven fabric having these stripes is made to be inclined in one direction by grooming means, with pile supporting yarn that supports the pile serving as pivot, and a front surface of the cut pile woven fabric is such that a plurality of cut pile yarns of different diameter cause the front surface to have steps comprising projections and recesses comprising the stripes or cut pile woven fabric having steps comprising projections and recesses forming the stripes wherein pile yarn comprises a plurality of cut pile yarns of different stretchabilities, or being sealing member comprising cut pile woven fabric which is such that a plurality of cut pile yarns of different material cause the front surface to have the steps comprising projections and recesses at the stripes or cut pile woven fabric which is such that pile yarns of different difference in elasticity cause the front surface to have difference in elasticity comprising projections and recesses comprising the stripes, being a sealing member for prevention of leakage of powder of prescribed shape comprising such sealing member comprising the cut pile woven fabric which is striped or such sealing member comprising the cut pile woven fabric which is striped and a laminating member, being sealing material for prevention of leakage of powder from the rotating body comprising this sealing member.

9. The sealing material comprising the cut pile woven fabric having stripes according to claim 8 characterized in that the sealing member comprising the cut pile woven fabric has the steps due to the stripes comprising the cut pile that has been made to be inclined or has been groomed, and furthermore is a sealing member for prevention of loss of fiber from the cut pile which is such that means for prevention of loss of fiber from the cut pile of the cut pile woven fabric having the stripes at the woven pile fabric makes use of at least one means among means for preventing loss of fiber making use of thermal fusing of the cut pile that has been made to be inclined, which is to say groomed, due to cut pile supporting yarn that contains thermally fused fiber which is ground yarn that supports the cut pile, means for preventing loss of fiber making use of solidification of coating agent applied to the back surface of said cut pile woven fabric after the cut pile has been made to be inclined, which is to say groomed, and means for preventing loss of fiber making use of solidification or coagulation of adhesive or hot-melt-type adhesive applied to the back surface of the cut pile woven fabric, being a sealing material for prevention of leakage of powder from a rotating body or a straight body that comprises this sealing member.

10. A sealing Material comprising cut pile woven fabric having stripes characterized in that it is a sealing material that prevents leakage of powder from a rotating body, being a sealing member comprising woven pile fabric in which pile yarn is made to be inclined or is groomed and in which stripes are formed, the pile yarn that forms the stripes being multifilament pile yarn comprising fibers, the cut pile woven fabric having the stripes comprising a plurality of the pile yarns, wherein pile yarns for which the number of filaments forming these pile yarns is different are used, being sealing member comprising cut pile woven fabric which is striped weave employing pile yarns of respectively different pile diameters, cut pile woven fabric comprising stripes employing pile yarns at which the number of filaments twisted therein is different and at which stretchabilities of the respective pile yarns are different, cut pile woven fabric comprising stripes employing pile yarns at which materials of filaments are different and at which percentage elongations and elasticities of the respective pile yarns are different, cut pile woven fabric comprising stripes employing pile yarns at which filament cross-sections are different, cut pile woven fabric comprising stripes employing pile yarns at which pile yarn filaments are of different diameter, cut pile woven fabric comprising steps at which the front surface of such cut pile woven fabric has projections and recesses at the stripes, or cut pile woven fabric comprising stripes and such that the front surface of the cut pile woven fabric comprising the stripes due to difference in elasticity of a plurality of pile yarns forming the stripes has the difference in elasticity at respective pile regions at which the stripes are formed, this sealing member comprising cut pile woven fabric comprising stripes being used, being sealing member formed in a prescribed shape, or being a sealing member for prevention of leakage of powder which is such that this sealing member is laminated with a laminating member and formed in the prescribed shape, being a sealing material for prevention of leakage of powder from the rotating body comprising this sealing member.

\* \* \* \* \*